United States Patent
Iwasaki

(10) Patent No.: US 10,356,302 B2
(45) Date of Patent: Jul. 16, 2019

(54) TRANSMISSION APPARATUS, RECEPTION APPARATUS, TRANSMISSION AND RECEPTION SYSTEM, TRANSMISSION APPARATUS CONTROL METHOD, RECEPTION APPARATUS CONTROL METHOD, TRANSMISSION AND RECEPTION SYSTEM CONTROL METHOD, AND PROGRAM

(71) Applicant: CANON KABUSHIKI KAISHA, Tokyo (JP)

(72) Inventor: Takahiro Iwasaki, Kiyose (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 14/485,449

(22) Filed: Sep. 12, 2014

(65) Prior Publication Data
US 2015/0077578 A1    Mar. 19, 2015

(30) Foreign Application Priority Data
Sep. 13, 2013    (JP) .................................. 2013-190476

(51) Int. Cl.
*H04N 5/232* (2006.01)
*H04N 7/18* (2006.01)
(Continued)

(52) U.S. Cl.
CPC ..... *H04N 5/23206* (2013.01); *H04N 1/00251* (2013.01); *H04N 1/32128* (2013.01);
(Continued)

(58) Field of Classification Search
CPC .......... H04N 5/23206; H04N 1/32128; H04N 1/00251; H04N 7/183; H04N 2201/3283; H04N 2201/3253; H04N 2201/3252; H04N 2201/3273; H04N 9/8205; H04N 5/765; H04N 5/23222; H04N 5/225; H04N 1/00; H04N 5/91; H04N 5/772; H04N 19/114; H04N 19/40; H04N 19/61; H04N 19/177;
(Continued)

(56) References Cited

U.S. PATENT DOCUMENTS 6,833,865 B1 * 12/2004 Fuller ................ H04N 1/00326
                                                           348/231.2
6,877,134 B1 *  4/2005 Fuller .................... G06F 16/58
                                                           715/202
(Continued)

FOREIGN PATENT DOCUMENTS

JP    2009-163572 A     7/2009
JP    2010-273125 A    12/2010
(Continued)

*Primary Examiner* — Dramos Kalapodas
(74) *Attorney, Agent, or Firm* — Canon U.S.A., Inc. I.P. Divison

(57) ABSTRACT

A monitoring camera, which can communicate with a client apparatus via an IP network, includes a communication unit configured to output an image and metadata relating to the image. The communication unit transmits encoding method information, which indicates configurability of an encoding method for each of the image and the relevant metadata output from the communication unit, to the client apparatus via the IP network.

16 Claims, 24 Drawing Sheets

(51) Int. Cl.
  *H04N 1/00* (2006.01)
  *H04N 1/32* (2006.01)
(52) U.S. Cl.
  CPC ..... *H04N 7/183* (2013.01); *H04N 2201/3252* (2013.01); *H04N 2201/3253* (2013.01); *H04N 2201/3273* (2013.01); *H04N 2201/3283* (2013.01)
(58) Field of Classification Search
  CPC ........... H04N 19/46; H04N 21/234336; H04N 21/435; H04N 21/84; H04N 21/235; H04N 9/87; H04N 7/185; H04N 7/181; H04N 21/4143; H04N 21/6125; H04N 5/247; H04N 21/47202; H04N 21/274; H04N 5/217; H04N 5/23229; H04N 5/23209; H04N 5/23203; H04N 9/8233; H04N 2101/00; H04N 2201/0053; H04N 2201/3277; H04N 7/12; H04N 7/14; H04N 19/13; H04N 19/44; H04N 19/42; H04N 19/176; H04N 19/895; H04N 7/18; H04N 21/2187; G06F 3/0481; G06F 17/30979; G06F 3/0484; G06F 7/00; G11B 27/034; G11B 27/031; G11B 27/28; G11B 27/34; G11B 27/105; G11B 27/329; G08B 13/19656; G06T 5/001; G06T 2207/10016; G06T 2207/30232; G06K 5/001; G06K 9/00771
  See application file for complete search history.

(56) References Cited

U.S. PATENT DOCUMENTS

| | | | | |
|---|---|---|---|---|
| 7,548,657 B2* | 6/2009 | Deaven | ............... | H04N 19/46 382/239 |
| 8,139,633 B2* | 3/2012 | Miyamaki | ........ | G08B 13/19656 375/240.01 |
| 8,503,639 B2* | 8/2013 | Reding | ................. | H04M 3/436 379/164 |
| 8,607,166 B2* | 12/2013 | Jalon | ..................... | G06F 3/0481 715/835 |
| 8,982,208 B2* | 3/2015 | Takeuchi | ........... | G06K 9/00771 348/143 |
| 9,125,073 B2* | 9/2015 | Oyman | ................. | H04W 24/04 |
| 2004/0267788 A1* | 12/2004 | Taniguchi | .............. | H04N 7/181 |
| 2005/0018057 A1* | 1/2005 | Bronstein | .......... | G06F 17/30265 348/239 |
| 2006/0110154 A1* | 5/2006 | Hulsen | ............... | H04N 1/32128 396/310 |
| 2006/0193534 A1* | 8/2006 | Hirose | ............. | G08B 13/19602 382/291 |
| 2007/0165103 A1* | 7/2007 | Arima | ....................... | G06T 3/40 348/14.01 |
| 2008/0218591 A1* | 9/2008 | Heier | ..................... | G06Q 20/20 348/150 |
| 2009/0219411 A1* | 9/2009 | Marman | ................ | H04N 5/772 348/231.99 |
| 2010/0115051 A1* | 5/2010 | Robert | ............. | G06F 17/30979 709/217 |
| 2010/0158099 A1* | 6/2010 | Kalva | .............. | H04N 21/23412 375/240.01 |
| 2010/0332981 A1* | 12/2010 | Lipton | ................. | G11B 27/034 715/716 |
| 2011/0050901 A1* | 3/2011 | Oya | ....................... | H04N 7/183 348/143 |
| 2011/0122292 A1* | 5/2011 | Yorita | .................... | H04N 5/772 348/231.3 |
| 2012/0113265 A1* | 5/2012 | Galvin | ................... | H04N 7/181 348/159 |
| 2014/0317308 A1* | 10/2014 | Zhang | ................ | H04L 65/4069 709/231 |
| 2014/0344691 A1* | 11/2014 | Lipton | ................. | G11B 27/034 715/716 |
| 2014/0351870 A1* | 11/2014 | Amine | ............... | H04N 21/2665 725/92 |
| 2015/0036003 A1* | 2/2015 | Sakurai | .................. | H04N 5/772 348/207.11 |

FOREIGN PATENT DOCUMENTS

| | | |
|---|---|---|
| JP | 2011-078008 A | 4/2011 |
| JP | 2012-142919 A | 7/2012 |

* cited by examiner

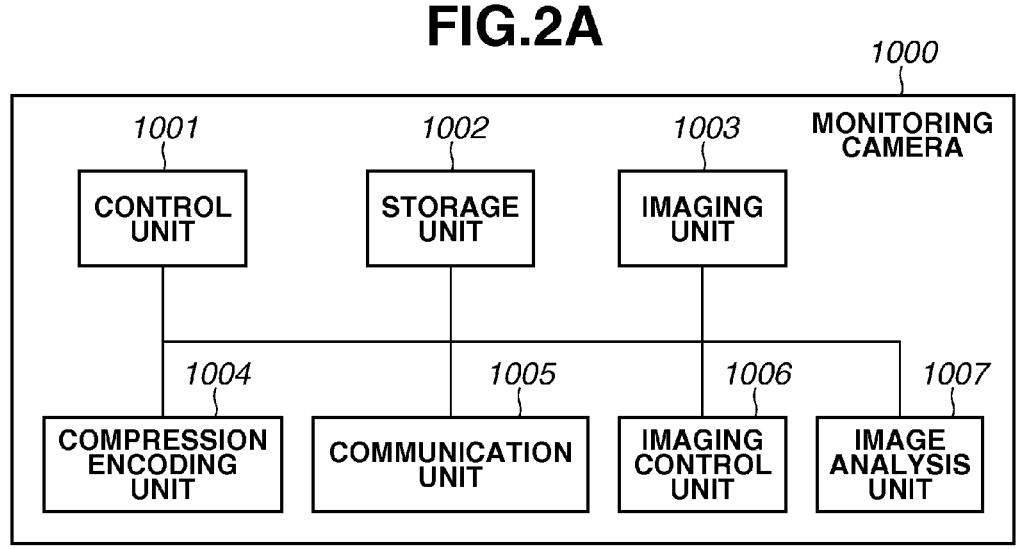
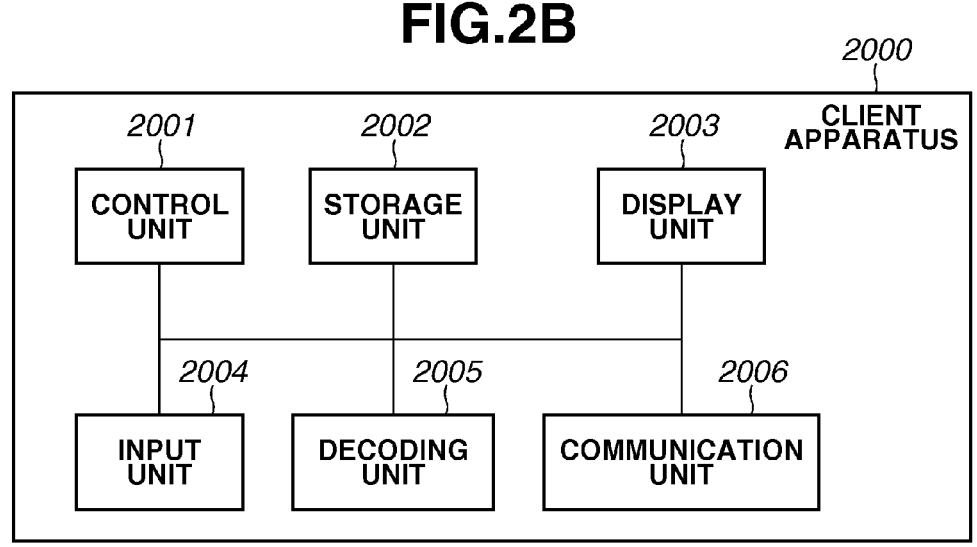

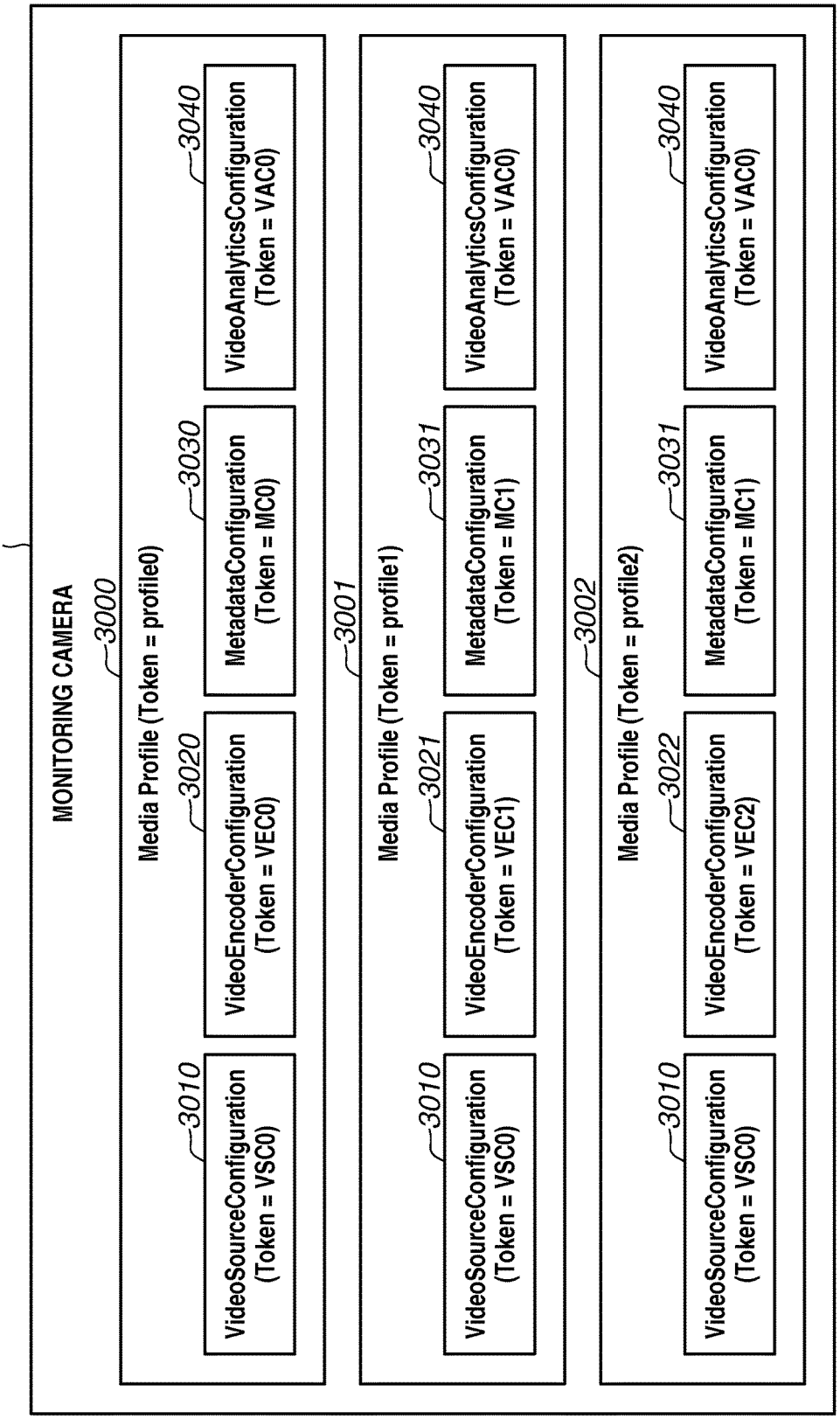

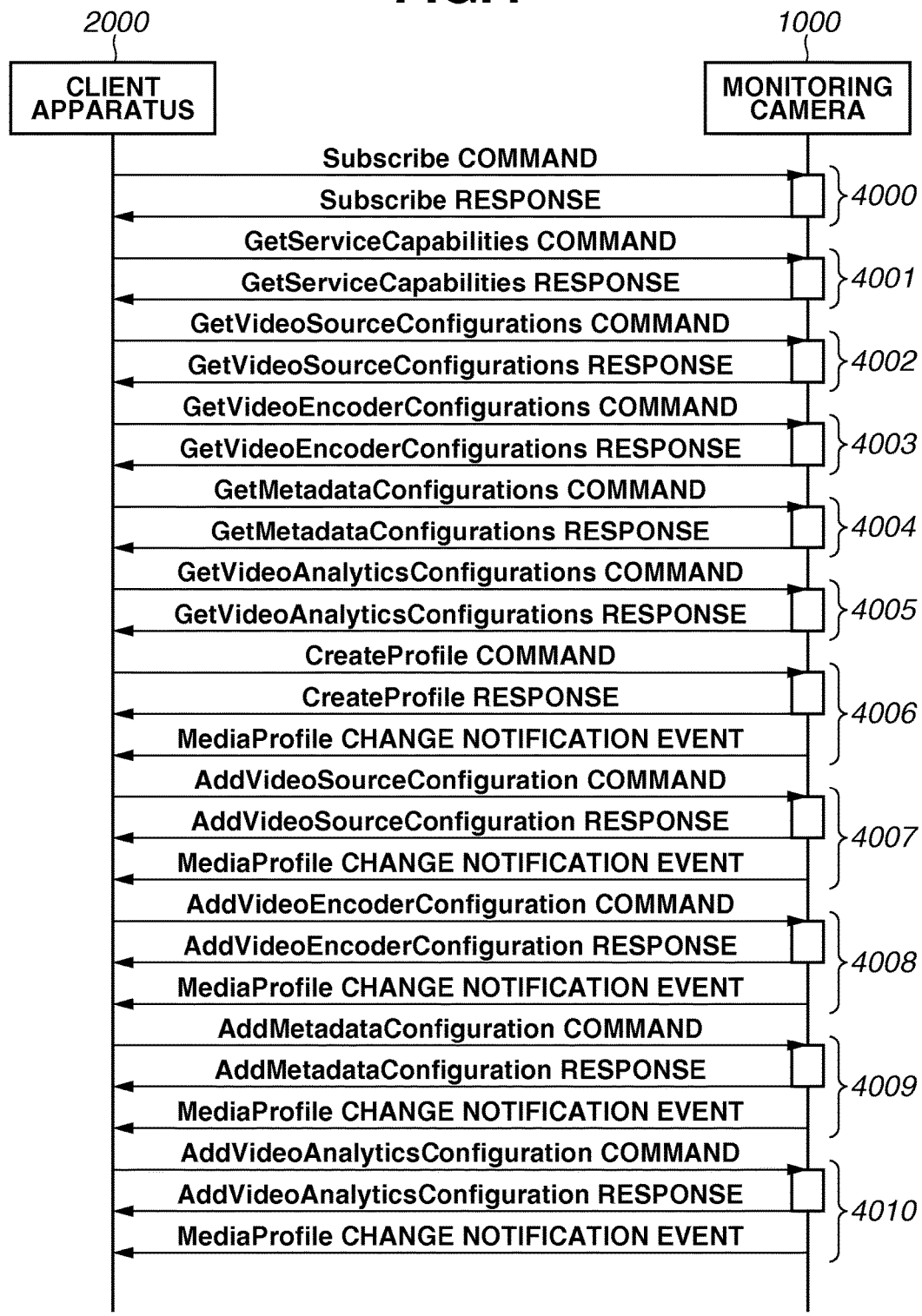

FIG.15A

REQUEST

```
<SOAP-ENV:Body>
 <GetMetadataConfigurations xmlns="http://www.onvif.org/ver10/media/wsdl">
 </GetMetadataConfigurations>
</SOAP-ENV:Body>
```

FIG.15B

RESPONSE

```
<SOAP-ENV:Body>
 <trt:GetMetadataConfigurationResponse>
  <trt:Configuration token="MC0">
   <tt:Name>metadata1</tt:Name>
   <tt:UseCount>2</tt:UseCount>
   <tt:PTZStatus>
    <tt:Status>true</tt:Status>
    <tt:Position>true</tt:Position>
   </tt:PTZStatus>
   <tt:Analytics>true</tt:Analytics>
   <tt:Multicast>
    <tt:Address>
     <tt:Type>IPv4</tt:Type>
     <tt:IPv4Address>0.0.0.0</tt:IPv4Address>
    </tt:Address>
    <tt:Port>0</tt:Port>
    <tt:TTL>0</tt:TTL>
    <tt:AutoStart>false</tt:AutoStart>
   </tt:Multicast>
   <tt:SessionTimeout>PT1M0S</tt:SessionTimeout>
   <tt:Extention>
    <tt:CompressionType>EXI</tt:CompressionType>     ~10000
   </tt:Extention>
  </trt:Configuration>
  <trt:Configuration token="MC1">
   <tt:Name>metadata2</tt:Name>
   <tt:UseCount>2</tt:UseCount>
   <tt:PTZStatus>
    <tt:Status>false</tt:Status>
    <tt:Position>false</tt:Position>
   </tt:PTZStatus>
   <tt:Analytics>false</tt:Analytics>
   <tt:Multicast>
    <tt:Address>
     <tt:Type>IPv4</tt:Type>
     <tt:IPv4Address>0.0.0.0</tt:IPv4Address>
    </tt:Address>
    <tt:Port>0</tt:Port>
    <tt:TTL>0</tt:TTL>
    <tt:AutoStart>false</tt:AutoStart>
   </tt:Multicast>
   <tt:SessionTimeout>PT1M0S</tt:SessionTimeout>
   <tt:Extention>
    <tt:CompressionType>None</tt:CompressionType>    ~10001
   </tt:Extention>
  </trt:Configuration>
 </trt:GetMetadataConfigurationResponse>
</SOAP-ENV:Body>
```

FIG.16A

REQUEST

```
<SOAP-ENV:Body>
 <GetMetadataConfigurationOptions xmlns="http://www.onvif.org/ver10/media/wsdl" />
</SOAP-ENV:Body>
```

FIG.16B

RESPONSE

```
<SOAP-ENV:Body>
 <trt:GetMetadataConfigurationOptionsResponse>
  <trt:Options>
   <tt:PTZStatusFilterOptions>
    <tt:PanTiltStatusSupported>true</tt:PanTiltStatusSupported>
    <tt:ZoomStatusSupported>true</tt:ZoomStatusSupported>
    <tt:PanTiltPositionSupported>true</tt:PanTiltPositionSupported>
    <tt:ZoomPositionSupported>true</tt:ZoomPositionSupported>
   </tt:PTZStatusFilterOptions>
   <tt:Extension>
    <tt:CompressionType>None</tt:CompressionType>
    <tt:CompressionType>EXI</tt:CompressionType>          ~11000
    <tt:CompressionType>FI</tt:CompressionType>
   <tt:/Extension>
  </trt:Options>
 </trt:GetMetadataConfigurationOptionsResponse>
</SOAP-ENV:Body>
```

FIG. 17

```
<tev8:MetadataStream xmlns:tev8="http://www.onvif.org/ver10/schema"
xmlns:tev6="http://docs.oasis-open.org/wsn/b-2" xmlns:wsa5="http://www.w3.org/2005/
08/addressing" xmlns:tns1="http://www.onvif.org/ver10/topics">
  <tev8:VideoAnalytics>
    <tev8:Frame UtcTime="2012-07-30T00:33:31.446740Z">
      <tev8:PTZStatus>
        <tev8:Position>
          <tev8:PanTilt space="http://www.onvif.org/ver10/tptz/PanTiltSpaces/
PositionGenericSpace" y="0.975000" x="1"></tev8:PanTilt>
          <tev8:Zoom space="http://www.onvif.org/ver10/tptz/ZoomSpaces/
PositionGenericSpace" x="0.068684"></tev8:Zoom>
        </tev8:Position>
        <tev8:MoveStatus>
          <tev8:PanTilt>IDLE</tev8:PanTilt>
          <tev8:Zoom>IDLE</tev8:Zoom>
        </tev8:MoveStatus>
        <tev8:Error/>
        <tev8:UtcTime>2012-07-30T00:33:31.446740Z</tev8:UtcTime>
      </tev8:PTZStatus>
      <tev8:Transformation>
        <tev8:Translate y="1" x="-1"/>
        <tev8:Scale y="-0.058823" x="0.033333"/>
      </tev8:Transformation>
      <tev8:Object ObjectId="758">
        <tev8:Appearance>
          <tev8:Shape>
            <tev8:BoundingBox left="32" right="60" top="0" bottom="34"/>
            <tev8:CenterOfGravity y="21" x="44"/>
          </tev8:Shape>
        </tev8:Appearance>
        <tev8:Behaviour/>
      </tev8:Object>
      <tev8:Object ObjectId="749">
        <tev8:Appearance>
          <tev8:Shape>
            <tev8:BoundingBox left="2" right="8" top="0" bottom="2"/>
            <tev8:CenterOfGravity y="0" x="5"/>
          </tev8:Shape>
        </tev8:Appearance>
        <tev8:Behaviour/>
      </tev8:Object>
      <tev8:Object ObjectId="762">
        <tev8:Appearance>
          <tev8:Shape>
            <tev8:BoundingBox left="46" right="54" top="10" bottom="19"/>
            <tev8:CenterOfGravity y="14" x="50"/>
          </tev8:Shape>
        </tev8:Appearance>
        <tev8:Behaviour/>
      </tev8:Object>
    </tev8:Frame>
  </tev8:VideoAnalytics>
</tev8:MetadataStream>
```

FIG.18A

REQUEST

DESCRIBE rtsp://172.23.21.209:554/stream/profile1=u RTSP/1.0
CSeq: 15
Accept: application/sdp
Authorization: Digest username="root", realm="Operator",
nonce="08e26192f91110cb994d7fc878c8271b", uri="rtsp://172.23.21.209:554/stream/
profile1=u", rsponse="f72c4bfc346df241016667d185abd975"
User-Agent: ClientApplication

FIG.18B

RESPONSE

RTSP/1.0 200 OK
CSeq: 15
Connection: Keep-alive
Date: Thu, 01 Aug 2012 05:48:39 GMT
Content-Type: application/sdp
Content-Length: 715 v=0
o=- 0 0 IN IP4 172.23.21.209
s=RTSP Session with audiobackchannel
t=0 0
c=IN IP4 0.0.0.0
a=control:*
m=video 0 RTP/AVP 99
a=rtpmap:99 H264/90000
a=fmtp:99 sprop-parameter-sets=Z0LgKdoDwEX7m4CAgwE=,aM48gA==;packetization-
mode=1;profile-level-id=42e029
a=control:rtsp://172.23.21.209/stream/profile1/AVCESEnc
a=framerate:30.0
a=recvonly
m=application 0 RTP/AVP 122 — 13001
a=rtpmap:122 vnd.onvif.metadata/90000
a=control:rtsp://172.23.21.209/stream/profile1/METAEnc
a=recvonly 13002, 13000

FIG.24

```
RTSP/1.0 200 OK
CSeq: 15
Connection: Keep-alive
Date: Thu, 01 Aug 2012 05:48:39 GMT
Content-Type: application/sdp
Content-Length: 715 v=0
o=- 0 0 IN IP4 172.23.21.209
s=RTSP Session with audiobackchannel
t=0 0
c=IN IP4 0.0.0.0
a=control:*
m=video 0 RTP/AVP 99
a=rtpmap:99 H264/90000
a=fmtp:99 sprop-parameter-sets=Z0LgKdoDwEX7m4CAgwE=,aM48gA==;packetization-
mode=1;profile-level-id=42e029
a=control:rtsp://172.23.21.209/stream/profile1/AVCESEnc
a=framerate:30.0
a=recvonly
    m=application 0 RTP/AVP 123       — 17001
    a=rtpmap:123 vnd.onvif.metadata/90000
    a=control:rtsp://172.23.21.209/stream/profile1/METAEnc    — 17000
    a=recvonly
```

17002 points to the a=rtpmap line; 17000 designates the inner block.

TRANSMISSION APPARATUS, RECEPTION APPARATUS, TRANSMISSION AND RECEPTION SYSTEM, TRANSMISSION APPARATUS CONTROL METHOD, RECEPTION APPARATUS CONTROL METHOD, TRANSMISSION AND RECEPTION SYSTEM CONTROL METHOD, AND PROGRAM

BACKGROUND OF THE INVENTION

Field of the Invention

The present invention relates to a transmission apparatus, a reception apparatus, a transmission and reception system, a method for controlling the transmission apparatus, a method for controlling the reception apparatus, a method for controlling the transmission and reception system, and a related program. In particular, the present invention relates to a technique for setting an encoding method applicable to each of an image and relevant metadata output from the transmission apparatus and relating to the image.

Description of the Related Art

As discussed in Japanese Patent Application Laid-Open No. 2010-273125, there is a conventional imaging apparatus that can output metadata including image analysis result and event information, together with captured image data, to an external device via a network. One of representative formats usable for the above-mentioned metadata is extensible markup language (XML).

Efficient XML Interchange (EXI) is a conventionally known technique for compressing and expanding the above-mentioned XML document. Further, Binary MPEG format for XML (BiM) and Fast Infoset (FI) are other conventional techniques comparable to the EXI.

The above-mentioned imaging apparatus can employ the compression and expansion technique described above to effectively distribute a great amount of metadata.

SUMMARY OF THE INVENTION

According to an aspect of the present invention, a transmission apparatus can communicate with a reception apparatus via a network. The transmission apparatus includes an output unit configured to output an image and metadata relating to the image, and a transmission unit configured to transmit encoding method information, which indicates configurability of an encoding method for each of the image and the relevant metadata output from the output unit, to the reception apparatus via the network.

According to another aspect of the present invention, a reception apparatus can communicate with a transmission apparatus, which includes an output unit configured to output an image and metadata relating to the image, via a network. The reception apparatus includes an acquisition unit configured to acquire encoding method information, which indicates configurability of an encoding method for each of the image and the relevant metadata output from the output unit, from the transmission apparatus, via the network.

According to another aspect of the present invention, a transmission and reception system includes a transmission apparatus and a reception apparatus that can communicate with the transmission apparatus via a network. The transmission apparatus includes an output unit configured to output an image and metadata relating to the image. The reception apparatus includes an acquisition unit configured to acquire encoding method information, which indicates configurability of an encoding method for each of the image and the relevant metadata output from the output unit, from the transmission apparatus via the network.

According to another aspect of the present invention, a method is provided to control a transmission apparatus that can communicate with a reception apparatus via a network. The method includes outputting an image and metadata relating to the image and transmitting encoding method information, which indicates configurability of an encoding method for each of the output image and the relevant metadata, to the reception apparatus via the network.

According to another aspect of the present invention, a method is provided to control a reception apparatus that can communicate with a transmission apparatus including an output unit configured to output an image and metadata relating to the image via a network. The method includes acquiring encoding method information, which indicates configurability of an encoding method for each of the image and the relevant metadata output from the output unit, from the transmission apparatus via the network.

According to another aspect of the present invention, a method is provided to control a transmission and reception system that includes a transmission apparatus and a reception apparatus that can communicate with the transmission apparatus via a network. The method includes causing the transmission apparatus to output an image and metadata relating to the image, and causing the reception apparatus to acquire encoding method information, which indicates configurability of an encoding method for each of the output image and the relevant metadata, from the transmission apparatus via the network.

According to another aspect of the present invention, a computer-readable storage medium stores a program that causes a computer to control a reception apparatus and a transmission apparatus that can communicate with each other via a network. The program includes computer-executable instructions for outputting an image and metadata relating to the image and computer-executable instructions for transmitting encoding method information, which indicates configurability of an encoding method for each of the output image and relevant metadata, to the reception apparatus via the network.

According to another aspect of the present invention, a computer-readable storage medium stores a program that causes a computer to control a transmission apparatus including an output unit configured to output an image and metadata relating to the image and a reception apparatus that can communicate with the transmission apparatus via a network. The program includes computer-executable instructions for acquiring encoding method information, which indicates configurability of an encoding method for each of the image and the relevant metadata output from the output unit, from the transmission apparatus via the network.

According to another aspect of the present invention, a computer-readable storage medium stores a program that causes a computer to control a transmission and reception system including a transmission apparatus and a reception apparatus that can communicate with the transmission apparatus via a network. The program includes computer-executable instructions for causing the transmission apparatus to output an image and metadata relating to the image, and computer-executable instructions for causing the reception apparatus to acquire encoding method information, which indicates configurability of an encoding method for each of the output image and the relevant metadata, from the transmission apparatus via the network.

Further features of the present invention will become apparent from the following description of exemplary embodiments with reference to the attached drawings.

BRIEF DESCRIPTION OF THE DRAWINGS

FIGS. 2A and 2B are block diagrams illustrating internal configurations of a monitoring camera and a client apparatus that constitute the imaging system according to the first exemplary embodiment.

FIG. 3 is a configuration diagram illustrating parameters that are held by the monitoring camera according to the first exemplary embodiment.

FIG. 4 is a sequence diagram illustrating media profile creation processing that can be performed by the monitoring camera and the client apparatus according to the first exemplary embodiment.

FIGS. 15A and 15B illustrate the contents of a GetMetadataConfigurations transaction that can be performed by the monitoring camera according to the first exemplary embodiment.

FIGS. 16A and 16B illustrate the contents of a GetMetadataConfigurationOptions transaction that can be performed by the monitoring camera according to the first exemplary embodiment.

FIG. 17 illustrates an example of Metadata that can be transmitted by the monitoring camera according to the first exemplary embodiment.

FIGS. 18A and 18B illustrate the contents of a DESCRIBE transaction that can be performed by the monitoring camera according to the first exemplary embodiment.

FIG. 24 illustrates the contents of a DESCRIBE transaction that can be performed by the monitoring camera according to the second exemplary embodiment.

DESCRIPTION OF THE EMBODIMENTS

Various exemplary embodiments, features, and aspects of the invention will be described in detail below with reference to the drawings.

Configurations described in the following exemplary embodiments are mere examples and therefore the present invention is not limited to the illustrated configurations.

Figure 1:
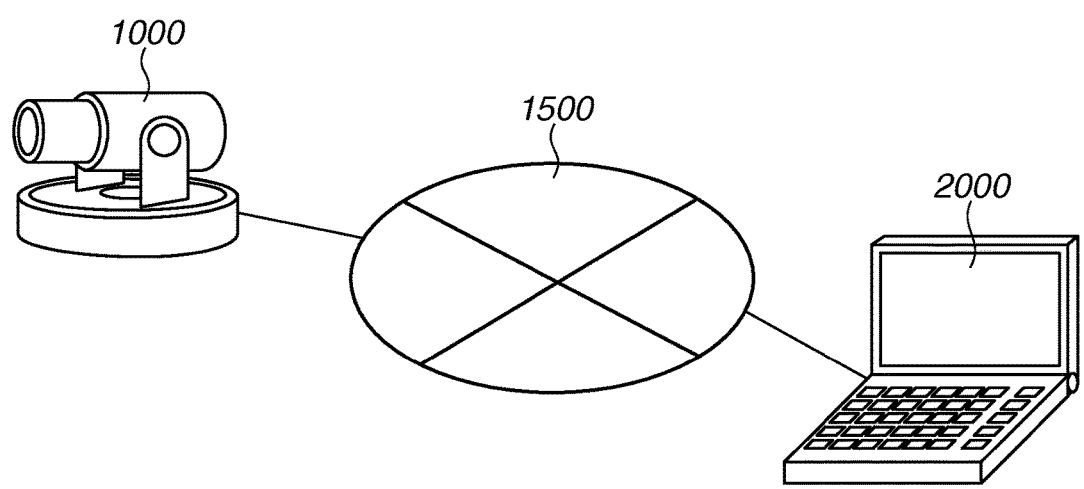
FIG. 1 is a system configuration diagram illustrating a configuration of an imaging system according to a first exemplary embodiment.

FIG. 1 is a system configuration diagram illustrating an imaging system that includes a monitoring camera 1000, which is functionally operable as a transmission apparatus according to a first exemplary embodiment. A client apparatus 2000 is functionally operable as a reception apparatus according to the present exemplary embodiment. The monitoring camera 1000 and the client apparatus 2000 are connected to each other and can communicate with each other via an IP network 1500. The imaging system according to the present exemplary embodiment is an example of a transmission and reception system.

The monitoring camera 1000 according to the present exemplary embodiment is an imaging apparatus that can capture a moving image. More specifically, the monitoring camera 1000 is a network camera that can be used in a monitoring operation.

The IP network 1500 includes a plurality of communication devices (e.g., routers, switches, and cables) that satisfy communication standards, such as Ethernet (registered trademark). However, any other network is employable in the present exemplary embodiment if it can realize communications between the monitoring camera 1000 and the client apparatus 2000 regardless of communication standards, scale, and configuration thereof.

For example, the IP network 1500 can be constituted by the Internet, a wired local area network (LAN), a wireless local area network (Wireless LAN), or a wide area network (WAN). Further, the monitoring camera 1000 according to the present exemplary embodiment can be configured to conform to, for example, Power over Ethernet (PoE) (registered trademark). Electric power can be supplied via a LAN cable to the monitoring camera 1000.

The client apparatus 2000 can transmit various commands, such as a shooting parameter change command, a camera platform driving command, and a video streaming start command, to the monitoring camera 1000. The monitoring camera 1000 can transmit responses to the received commands and video streaming to the client apparatus 2000. In the present exemplary embodiment, metadata corresponds to an XML document.

Subsequently, FIGS. 2A and 2B are block diagrams illustrating the monitoring camera 1000 and the client apparatus 2000 according to the present exemplary embodiment. FIG. 2A is a block diagram illustrating an internal configuration of the monitoring camera 1000. FIG. 2B is a block diagram illustrating an internal configuration of the client apparatus 2000.

In FIG. 2A, a control unit 1001 can control various operations to be performed by the monitoring camera 1000. The control unit 1001 is, for example, constituted by a central processing unit (CPU). A storage unit 1002 serves as a storing area of control programs that can be executed by the control unit 1001, a work area of a program being currently in progress, and a storing area of any other data, such as image data that can be generated by an imaging unit 1003.

When the monitoring camera 1000 captures an image of an imaging target focused through an imaging optical system thereof, the imaging unit 1003 converts an acquired analog signal into digital data and outputs the digital data as image data to the storage unit 1002. A compression encoding unit 1004 can perform JPEG or H.264 compression encoding processing on the image data output from the imaging unit 1003 and generate the compression encoded image data.

Further, the compression encoding unit 1004 outputs the generated image data to the storage unit 1002. In this case, the compression encoding unit 1004 causes the control unit 1001 to generate a VIDEO transmission trigger to notify the output of a distributable image. A communication unit 1005 can receive a control command from an external device, and transmit a response to the received control command and streaming including image data to the external device.

In the present exemplary embodiment, the client apparatus 2000 is an example of the external device.

An imaging control unit 1006 can control a tilting mechanism, a panning mechanism, and a zooming mechanism according to panning angle, tilting angle, and zoom magnification values input by the control unit 1001. Further, the imaging control unit 1006 periodically transmits PTZ Position information to the control unit 1001 while setting a PTZPosition transmission flag. The PTZ Position information includes latest values of the panning angle, the tilting angle, and the zoom magnification.

Further, the imaging control unit 1006 transmits PTZ Status information to the control unit 1001 while setting a PTZStatus transmission flag. The PTZ Status information includes latest operating states of the panning, tilting, and zooming mechanisms. An image analysis unit 1007 can analyze image data output from the imaging unit 1003 and can detect an object included in the image data.

The detected object information is output, as XML format metadata, to the storage unit 1002. In the present exemplary embodiment, the image analysis unit 1007 is functionally operable as an object detection unit configured to detect an object included in an image output from the imaging unit 1003.

Further, the image analysis unit 1007 can transmit the detected object information to the control unit 1001 while setting an image analysis result transmission trigger. Further, the image analysis unit 1007 can transmit event information to the control unit 1001. The event information includes a detection result indicating whether a moving object has appeared in a video based on an analysis on the detected object information.

In the present exemplary embodiment, each of the compression encoding unit 1004, the imaging control unit 1006, and the image analysis unit 1007 is, for example, constituted by a sub CPU. Further, in the present exemplary embodiment, each of the panning mechanism, the tilting mechanism, and the zooming mechanism includes a stepping motor and gears. Further, each of the panning mechanism, the tilting mechanism, and the zooming mechanism is an example of a changing unit configured to change the position of the imaging unit 1003.

In FIG. 2B, a control unit 2001 is constituted, for example, by a CPU that can control various operations to be performed by the client apparatus 2000. A storage unit 2002 serves as a storing area of control program that can be executed by the control unit 2001, a work area of a program being currently in progress, and a storing area of various data.

A display unit 2003 is constituted, for example, by a liquid crystal display (LCD) or an organic EL display unit. The display unit 2003 can display various setting screens including a distribution image setting screen, a viewer of a video that can be received from the monitoring camera 1000, and various messages for a user of the client apparatus 2000.

An input unit 2004 is constituted, for example, by buttons, a cross-key, a touch panel, and a mouse. The input unit 2004 notifies the control unit 2001 of contents about a screen operation performed by a user. A decoding unit 2005 can decode the compression encoded image data or metadata received via a communication unit 2006 and can develop the decoded data in the storage unit 2002.

The communication unit 2006 can transmit each control command to the monitoring camera 1000 and can receive a stream including a response to each control command and image data from the monitoring camera 1000. In the present exemplary embodiment, the decoding unit 2005 is, for example, constituted by a sub CPU.

Although the internal configurations of the monitoring camera 1000 and the client apparatus 2000 have been described with reference to FIGS. 2A and 2B, the processing blocks illustrated in FIGS. 2A and 2B are mere examples of the monitoring camera and the client apparatus according to the present exemplary embodiment. The present invention is not limited to the constituent components illustrated in FIGS. 2A and 2B. For example, the monitoring camera and the client apparatus can include a voice input unit or a voice output unit and can be modified and changed in various ways within the scope of the present invention.

Subsequently, names and contents of commands and parameters that are used in the present exemplary embodiment are described in detail below with reference to FIG. 3. FIG. 3 illustrates a structure of parameters that are held by the monitoring camera 1000 in the present exemplary embodiment.

In FIG. 3, media profiles 3000, 3001, and 3002 are three sets of parameters that can be used to store various setting items of the monitoring camera 1000 in association with each other. Each of the media profiles 3000, 3001, and 3002 holds a profile token, which represents ID information about the media profile.

Further, each of the media profiles 3000, 3001, and 3002 holds links to various setting items. The various setting items include VideoSourceConfiguration, VideoEncoderConfiguration, MetadataConfiguration, and VideoAnalyticsConfiguration.

The setting item VideoSourceConfiguration 3010 includes VideoSourceToken, which is ID information about VideoSource (not illustrated) that is an assembly of parameters that represent the performance of the imaging unit 1003 provided in the monitoring camera 1000. Further, the setting item VideoSourceConfiguration 3010 includes Resolution that indicates the resolution of image data that can be output from the imaging unit 1003.

In the following description, VSC represents the setting item VideoSourceConfiguration.

Each of setting items VideoEncoderConfigurations 3020, 3021, and 3022 is an assembly of parameters that associate encoder settings relating to image data compression encoding with the media profile.

In the present exemplary embodiment, the monitoring camera 1000 performs compression encoding on image data according to parameters, such as compression encoding method (e.g., JPEG or H.264), frame rate, and resolution, in the setting item VideoEncoderConfiguration.

The monitoring camera 1000 distributes the compression encoded image data to the client apparatus 2000 via the communication unit 1005. In this case, the image data is output based on the contents of VideoSource and VideoSourceConfiguration. In the following description, VEC represents the setting item VideoEncoderConfiguration.

Further, the setting item VEC includes VECToken representing ID information about the VEC, Encoding designating compression encoding method, Resolution designating the resolution of an output image, and Quality designating compression encoding quality. Further, the setting item VEC includes FramerateLimit designating a maximum frame rate of the output image and BitrateLimit designating a maximum bit rate.

Each of setting items MetadataConfigurations 3030 and 3031 is a set of parameters that relate to XML format text data to be used in the streaming of the monitoring camera 1000 together with an image. In the following description, MDC represents the setting item MetadataConfiguration.

Further, the setting item MDC includes MDCToken representing ID information of the MDC, PTZ Status flag indicating whether to output status information about the imaging control unit 1006, and PTZ Position flag indicating whether to output position information about the imaging control unit 1006. An image capturing position defined in the present exemplary embodiment corresponds to a panning angle value (i.e., the position of the imaging unit 1003 in the panning direction), a tilting angle value (i.e., the position of the imaging unit 1003 in the tilting direction), and a zoom magnification value (i.e., the angle of view of the monitoring camera 1000).

Further, the setting item MDC includes Analytics flag indicating whether to cause the image analysis unit 1007 to generate object information, Events designating a topic of event data to be included in the output, and CompressionType designating a compression method.

The setting item VideoAnalyticsConfiguration 3040 is an assembly of parameters that associate the settings of the image analysis unit 1007 with the media profile. In the following description, VAC represents the setting item VideoAnalyticsConfiguration. Further, the setting item VAC includes VACToken representing ID information of the VAC and RuleConfiguration accepting image analysis rule settings.

FIG. 4 illustrates a typical command sequence for media profile setting in video distribution between the monitoring camera 1000 and the client apparatus 2000. In the present exemplary embodiment, each transaction is a combination of a command to be transmitted from the client apparatus 2000 to the monitoring camera 1000 and a response to be returned from the monitoring camera 1000 to the client apparatus 2000.

A transaction 4000 is a combination of a Subscribe command and a Subscribe response. Executing the Subscribe command causes the monitoring camera 1000 to transmit an internally generated event to the client apparatus 2000.

A transaction 4001 is a combination of a GetServiceCapabilities command and a GetServiceCapabilities response. Executing the GetServiceCapabilities command causes the monitoring camera 1000 to return function information indicating supportable functions. The function information includes information whether the monitoring camera 1000 can support metadata compression transmission processing. Accordingly, the GetServiceCapabilities response includes encoding method information about configurability of an encoding method for the metadata output from the monitoring camera 1000.

A transaction 4002 is a combination of a GetVSCs command and a GetVSCs response. Executing the GetVSCs command enables the client apparatus 2000 to acquire a VSC list that is held by the monitoring camera 1000.

A transaction 4003 is a combination of a GetVECs command and a GetVECs response. Executing the GetVECs command enables the client apparatus 2000 to acquire a VEC list that is held by the monitoring camera 1000.

A transaction 4004 is a combination of a GetMDCs command and a GetMDCs response. Executing the GetMDCs command enables the client apparatus 2000 to acquire a MDC list that is held by the monitoring camera 1000.

A transaction 4005 is a combination of a GetVACs command and a GetVACs response. Executing the GetVACs command enables the client apparatus 2000 to acquire a VAC list that is held by the monitoring camera 1000.

A transaction 4006 includes a CreateProfile command and a CreateProfile response. Executing the CreateProfile command causes the monitoring camera 1000 to create a new media profile and enables the client apparatus 2000 to obtain a profile token of the created media profile.

After completing the above-mentioned command processing, the monitoring camera 1000 transmits a MediaProfile change notification event to the client apparatus via the network to notify the occurrence of a change in the media profile.

Similarly, a transaction 4007 includes an AddVSC command and an AddVSC response. A transaction 4008 includes an AddVEC command and an AddVEC response. A transaction 4009 includes an AddMDC command and an AddMDC response. A transaction 4010 includes an AddVAC command and an AddVAC response. By designating a Configuration Token in each of the above-mentioned commands, the client apparatus 2000 can associate a designation media profile with a desired setting item VSC, VEC, MDC, or VAC.

After completing the above-mentioned command processing, the monitoring camera 1000 transmits a MediaProfile change notification event to the client apparatus via the network to notify the occurrence of a change in the media profile.

Figure 5:
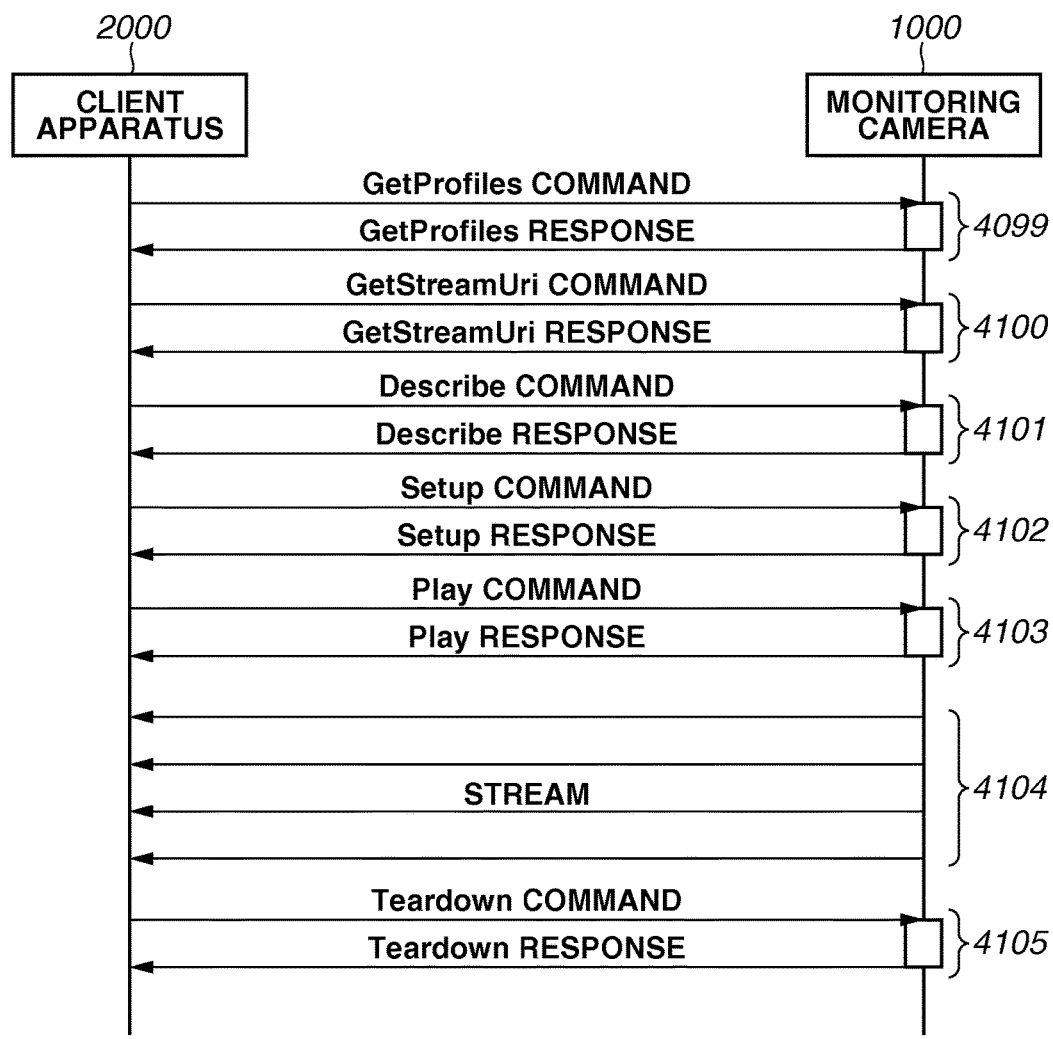
FIG. 5 is a sequence diagram illustrating streaming start processing that can be performed by the monitoring camera and the client apparatus according to the first exemplary embodiment.

FIG. 5 illustrates a typical command sequence in which the client apparatus 2000 causes the monitoring camera 1000 to start streaming.

A transaction 4099 is a combination of a GetProfiles command and a GetProfiles response. Executing the GetProfiles command enables the client apparatus 2000 to acquire a media profile list that is held by the monitoring camera 1000. According to the example illustrated in FIG. 3, the monitoring camera 1000 transmits a list of the first media profile (Token=profile0), the second media profile (Token=profile1), and the third media profile (Token=profile2).

A transaction 4100 is a combination of a GetStreamUri command and a GetStreamUri response. Executing the GetStreamUri command enables the client apparatus 2000 to acquire address information (StreamURI) that is required when the monitoring camera 1000 performs a stream distribution based on designated media profile settings.

A transaction 4101 is a combination of a Describe command and a Describe response. Executing the Describe command using the URI information acquired in the transaction 4100 enables the client apparatus 2000 to request and acquire information about stream contents to be distributed by the monitoring camera 1000.

FIGS. 18A and 18B illustrate a request and a response relating to the Describe command. The response illustrated in FIG. 18B includes information relating to metadata contents 13000 to be provided from the monitoring camera 1000 to the client apparatus 2000. The response illustrated in FIG. 18B further includes numerical values 13001 and 13002 representing RTP Payload Type.

Referring back to the sequence diagram illustrated in FIG. 5, a transaction 4102 is a combination of a Setup command and a Setup response. Executing the Setup command using the URI information acquired in the transaction 4100 enables the client apparatus 2000 and the monitoring camera 1000 to share a transmission method for a stream including a session number.

A transaction 4103 is a combination of a Play command and a Play response. Executing the Play command using the session number acquired in the transaction 4102 enables the client apparatus 2000 to request the monitoring camera 1000 to start distributing a stream.

A transaction 4104 includes a streaming distribution. The monitoring camera 1000 distributes the stream whose starting is requested in the transaction 4103 according to the transmission method shared in the transaction 4102.

A transaction 4105 is a combination of a Teardown command and a Teardown response. Executing the Teardown command using the session number acquired in the transaction 4102 enables the client apparatus 2000 to request the monitoring camera 1000 to stop the streaming distribution.

Figure 6:
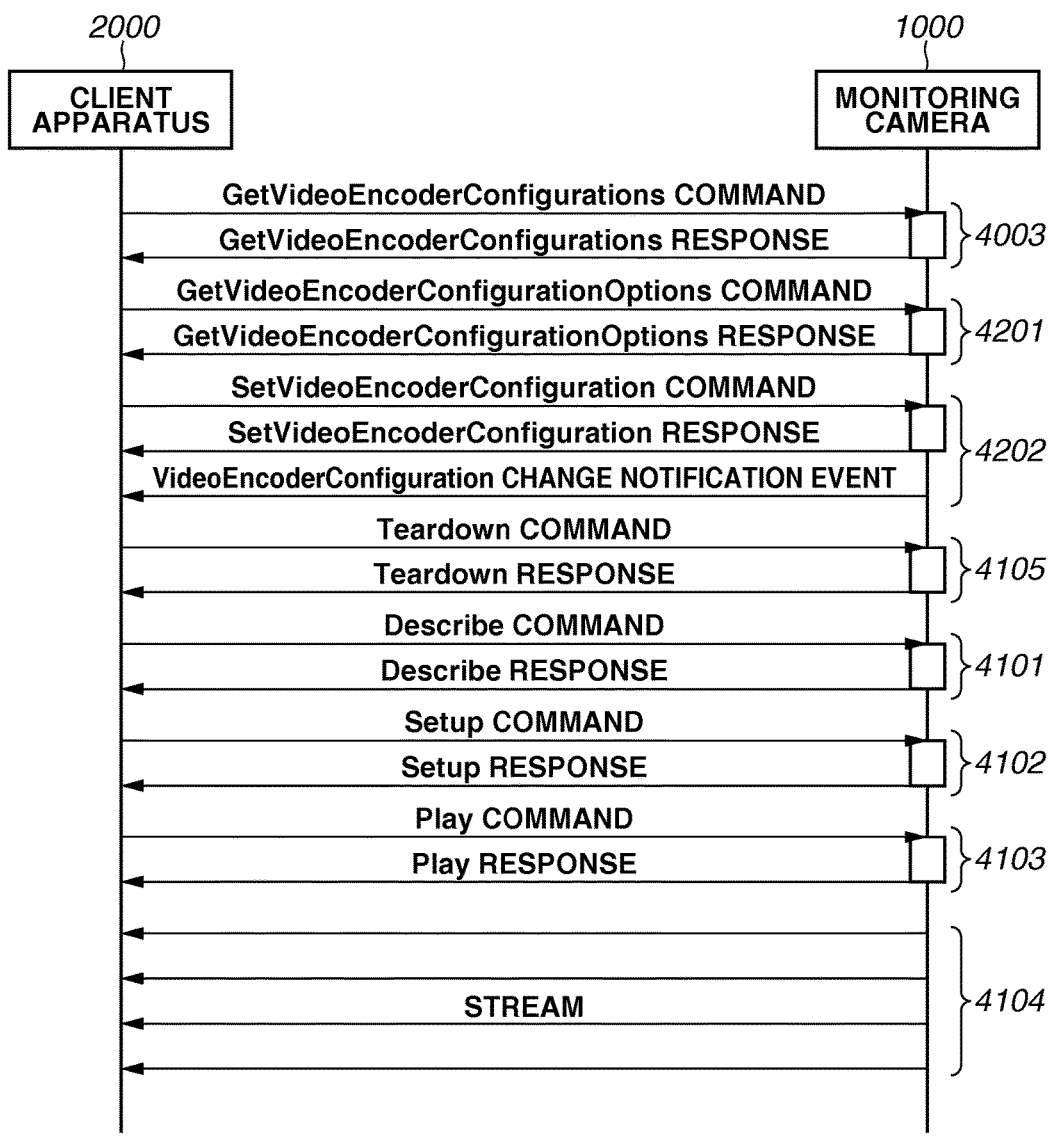
FIG. 6 is a sequence diagram illustrating VideoEncoder-Configuration setting processing that can be performed by the monitoring camera and the client apparatus according to the first exemplary embodiment.

FIG. 6 illustrates a typical command sequence in which the client apparatus 2000 causes the monitoring camera 1000 to change the setting contents of the setting item VEC.

A transaction 4201 is a GetVECOptions command and a GetVECOptions response. Executing the GetVECOptions command enables the client apparatus 2000 to acquire an option and a setting value range with respect to each parameter that the monitoring camera 1000 can accept, in the setting item VEC designated based on the ID information.

A transaction 4202 includes a SetVEC command and a SetVEC response. Executing the SetVEC command enables the client apparatus 2000 to set each parameter of the setting item VEC. After completing the above-mentioned command processing, the monitoring camera 1000 transmits a VEC change notification event to the client apparatus via the network to notify the occurrence of a change in the setting item VEC.

To validate setting contents of the setting item VEC changed through the transaction 4202, the client apparatus 2000 sequentially executes transactions 4105, 4101, 4102, and 4103 to cause the monitoring camera 1000 to restart the streaming distribution.

Figure 7:
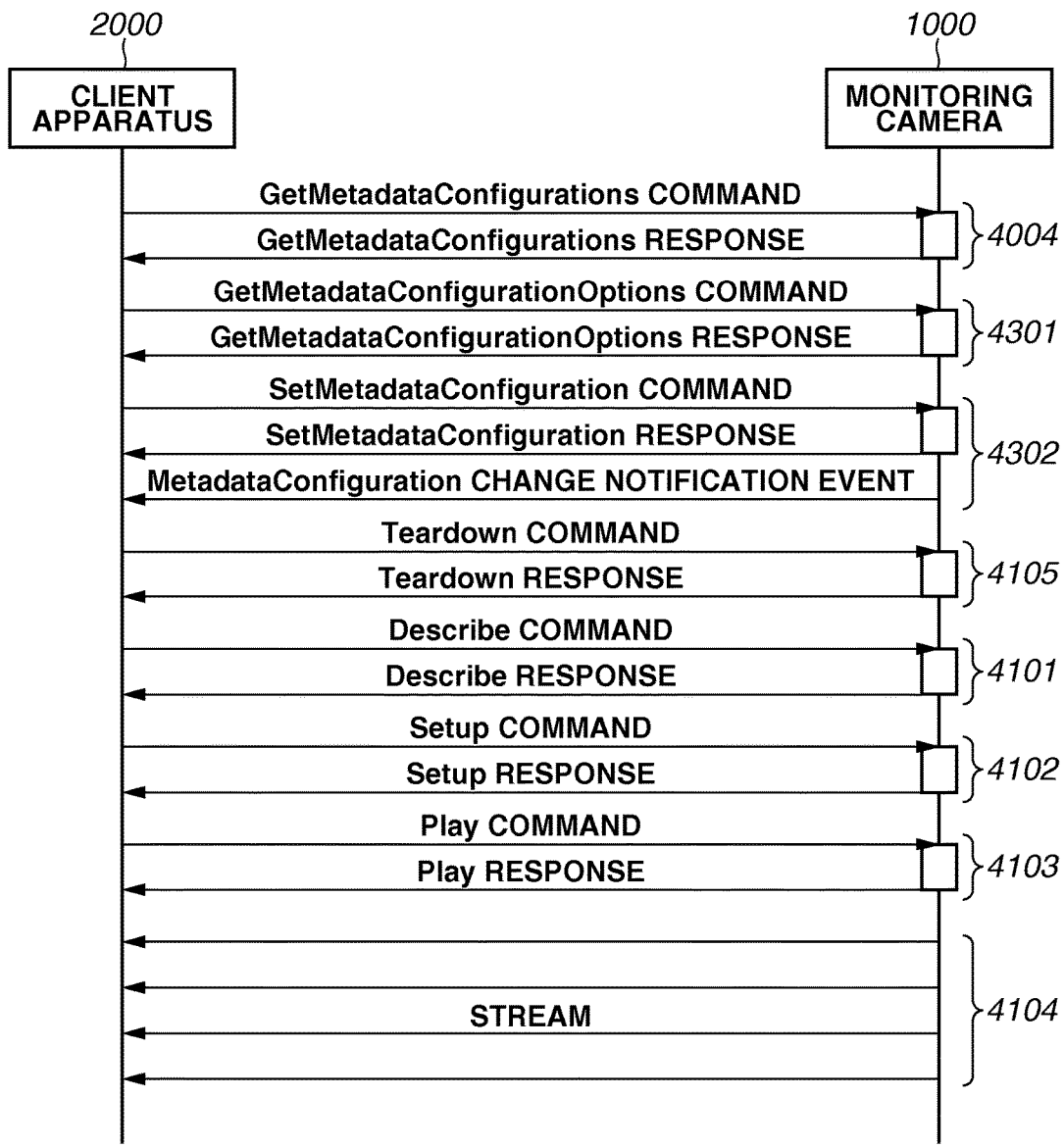
FIG. 7 is a sequence diagram illustrating MetadataConfiguration setting processing that can be performed by the monitoring camera and the client apparatus according to the first exemplary embodiment.

FIG. 7 illustrates a typical command sequence in which the client apparatus 2000 causes the monitoring camera 1000 to change the setting contents of the setting item MDC.

A transaction 4301 is a combination of a GetMDCOptions command and a GetMDCOptions response. Executing the GetMDCOptions command enables the client apparatus 2000 to acquire an option and a setting value range with respect to each parameter that the monitoring camera 1000 can accept, in the setting item MDC designated based on the ID information.

A transaction 4302 includes a SetMDC command and a SetMDC response. Executing the SetMDC command enables the client apparatus 2000 to set each parameter of the setting item MDC. After completing the above-mentioned command processing, the monitoring camera 1000 transmits a MDC change notification event to the client apparatus via the network to notify the occurrence of a change in the setting item MDC.

To validate setting contents of the setting item MDC changed through the transaction 4302, the client apparatus 2000 sequentially executes transactions 4105, 4101, 4102, and 4103 to cause the monitoring camera 1000 to restart the streaming distribution.

Figure 8:
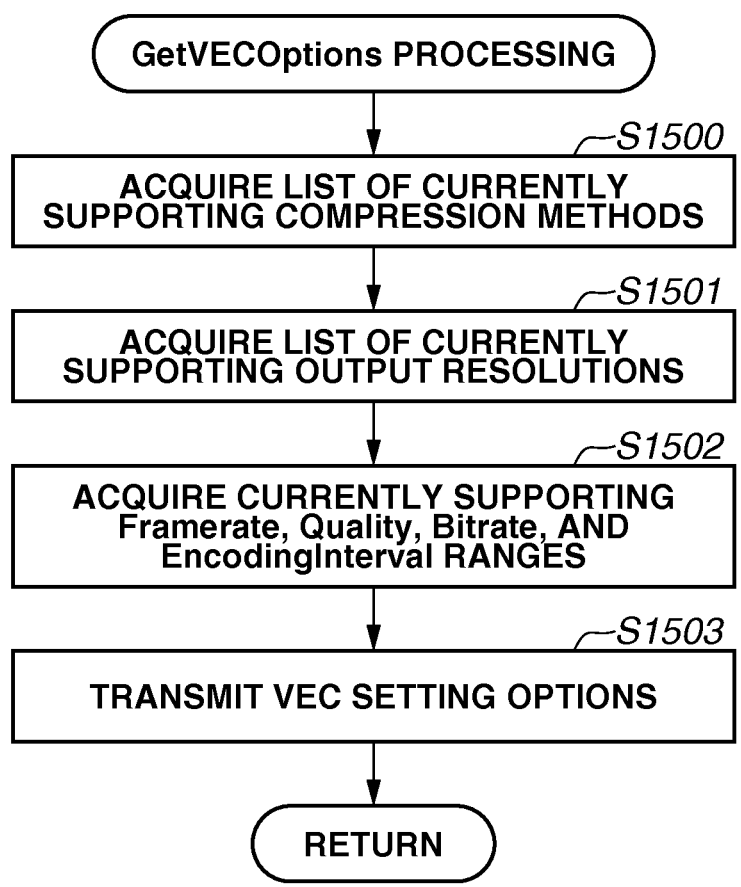
FIG. 8 is a flowchart illustrating the behavior of the monitoring camera in the reception of a GetVideoEncoderConfigurationOptions command according to the first exemplary embodiment.

FIG. 8 illustrates processing that can be performed by the monitoring camera 1000 when the monitoring camera 1000 receives the GetVECOptions command from the client apparatus 2000.

In step S1500, the control unit 1001 acquires a list of currently supporting compression methods, which are stored in the storage unit 1002. For example, the list acquired in step S1500 includes JPEG and H.264 compression methods.

In step S1501, the control unit 1001 acquires a list of currently supporting output resolutions, which are stored in the storage unit 1002. For example, the list acquired in step S1501 includes 1280×960, 1024×768, 640×480, and 320×240.

In step S1502, the control unit 1001 acquires settable values of Framerate range, image quality Quality range, Bitrate range, and EncodingInterval. For example, the FramerateLimit value acquired by the control unit 1001 is 1 to 30 fps. The acquired Quality range value is 1 to 5. The acquired Bitrate range value is 64 to 16384 bps.

In step S1503, the control unit 1001 transmits the options and setting ranges acquired in steps S1500 to S1502, as part of a normal response, to the client apparatus 2000 via the communication unit 1005.

Figure 9:
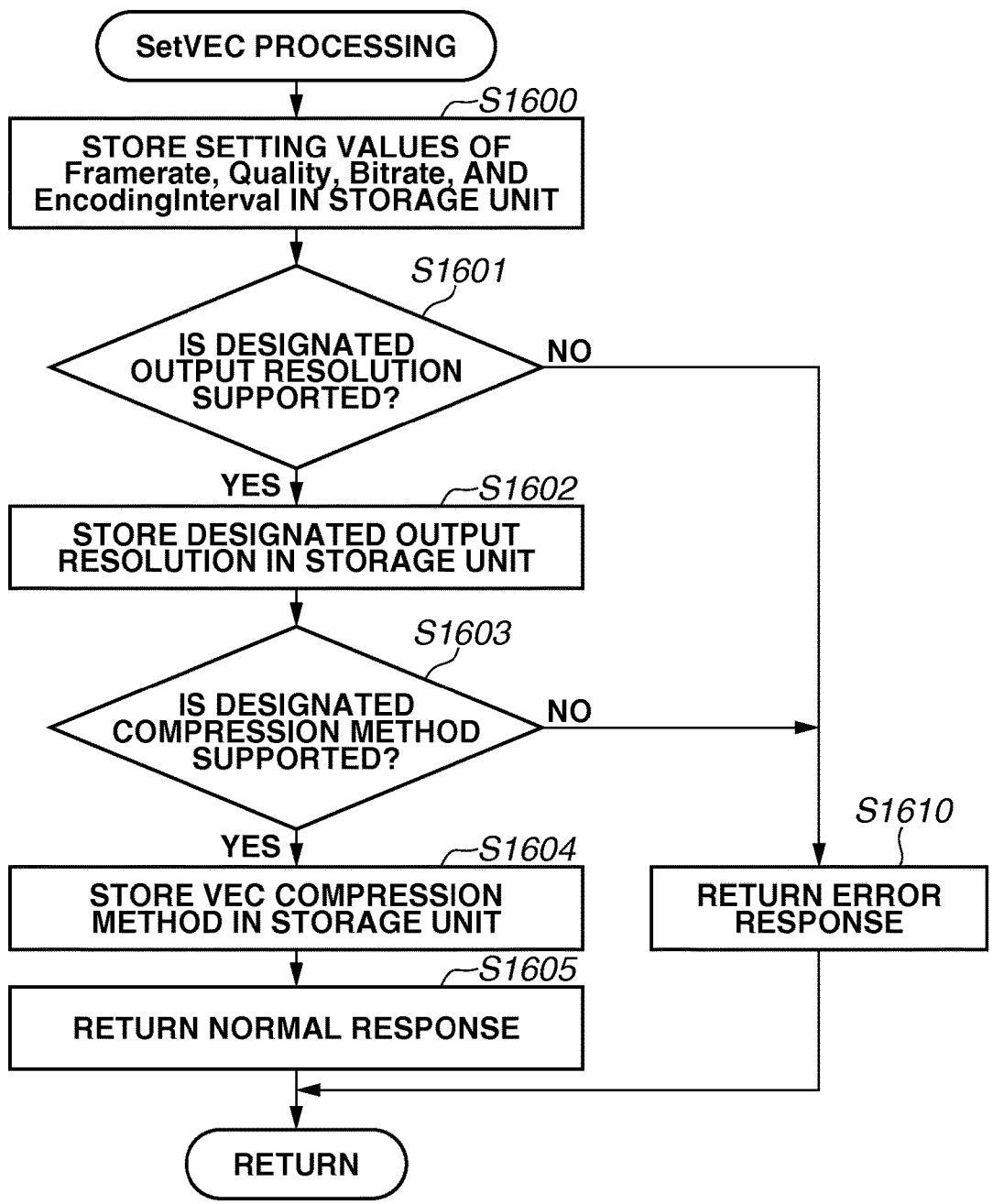
FIG. 9 is a flowchart illustrating the behavior of the monitoring camera in the reception of a SetVideoEncoderConfiguration command according to the first exemplary embodiment.

FIG. 9 illustrates example processing that can be performed by the monitoring camera 1000 when the monitoring camera 1000 receives the above-mentioned SetVEC command from the client apparatus 2000.

In step S1600, the control unit 1001 stores respective setting values of Framerate, Quality, Bitrate, and EncodingInterval designated using an argument of the SetVEC command in the storage unit 1002.

In step S1601, the control unit 1001 determines whether the output resolution Resolution designated using the argument of the SetVEC command is currently supported. More specifically, the control unit 1001 determines whether the output resolution list acquired from the storage unit 1002 in step S1501 includes the output resolution Resolution designated using an argument of the SetVEC command.

If it is determined that the output resolution list includes the designated output resolution Resolution (NO in step S1601) which is not supported, the operation of the control unit 1001 proceeds to step S1610. If it is determined that the output resolution list includes the designated output resolution Resolution (YES in step S1601) which is supported, the operation of the control unit 1001 proceeds to step S1602.

In step S1602, the control unit 1001 causes the storage unit 1002 to store the output resolution Resolution designated using the argument of the SetVEC command.

In step S1603, the control unit 1001 determines whether the compression method Encording designated using the argument of the SetVEC command is currently supported. More specifically, the control unit 1001 determines whether the compression method list that the control unit 1001 has acquired from the storage unit 1002 in step S1500 includes the compression method Encording designated using an argument of the SetVEC command.

If it is determined that the compression method list does not include the designated compression method Encording (NO in step S1603), the operation of the control unit 1001 proceeds to step S1610. If it is determined that the compression method list includes the designated compression method Encording (YES in step S1603), the operation of the control unit 1001 proceeds to step S1604.

In step S1604, the control unit 1001 causes the storage unit 1002 to store the compression method Encording designated using the argument of the SetVEC command.

In step S1605, the control unit 1001 returns a normal response to the client apparatus 2000 via the communication unit 1005 and terminates the processing of the flowchart illustrated in FIG. 9.

In step S1610, the control unit 1001 returns an error response to the client apparatus 2000 via the communication unit 1005 and terminates the processing of the flowchart illustrated in FIG. 9.

Figure 10:
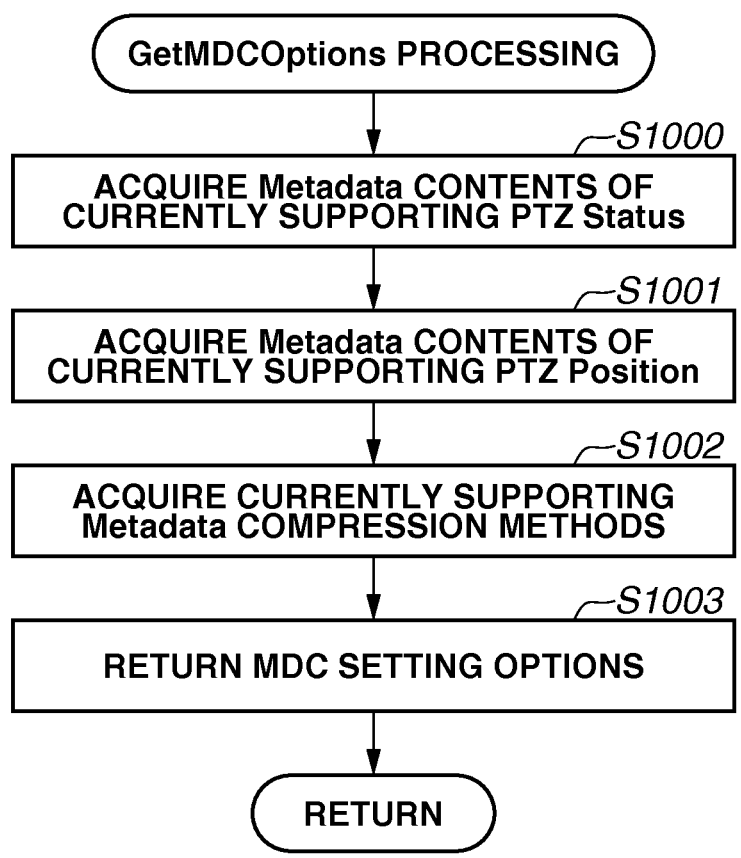
FIG. 10 is a flowchart illustrating the behavior of the monitoring camera in the reception of a GetMetadataConfigurationOptions command according to the first exemplary embodiment.

FIG. 10 illustrates example processing that can be performed by the monitoring camera 1000 when the monitoring camera 1000 receives the above-mentioned GetMDCOptions command from the client apparatus 2000. FIG. 16A illustrates a request content of the GetMDCOptions command, and FIG. 16B illustrates a response content of the GetMDCOptions command.

In step S1000, the control unit 1001 acquires metadata contents of currently supporting PTZ Status, which are stored in the storage unit 1002. The PTZ Status is status information indicating operating states of the panning mechanism, the tilting mechanism, and the zooming mechanism that are controlled by the imaging control unit 1006.

In FIG. 16B, a PanTiltStatusSupported flag is a parameter that indicates the status information about the panning mechanism and the tilting mechanism and a ZoomStatusSupported flag is a parameter that indicates the support of the zooming mechanism. In the present exemplary embodiment, it is supposed that both of the above-mentioned flags are True, which indicates that information acquired by the control unit 1001 is "being currently supported" as illustrated in FIG. 16B.

In step S1001, the control unit 1001 acquires metadata contents of currently supporting PTZ Position, which are stored in the storage unit 1002. The PTZ Position is status information indicating present positions of the panning mechanism, the tilting mechanism, and the zooming mechanism that are controlled by the imaging control unit 1006.

In FIG. 16B, a PanTiltPositionSupported flag is a parameter that indicates the present positions of the panning mechanism and the tilting mechanism and a ZoomPositionSupported flag is a parameter that indicates the present position of the zooming mechanism. In the present exemplary embodiment, it is supposed that both of the above-mentioned flags are True, which indicates that information acquired by the control unit 1001 is "being currently supported" as illustrated in FIG. 16B.

In step S1002, the control unit 1001 acquires a list of currently supporting metadata compression methods, which is stored in the storage unit 1002. For example, the acquired metadata compression method list includes None (non-compression), EXI, FI, and BiM. In FIG. 16B, CompressionType 11000 indicates that the metadata compression methods acquired by the control unit 1001 are None, EXI, and FI in the present exemplary embodiment.

In the present exemplary embodiment, the GetMDCOptions response in the transaction 4301 and the GetVECOptions response in the transaction 4201 are examples of the encoding method information to be transmitted in step S1503.

In step S1003, the control unit 1001 returns the information acquired in steps S1000, S1001, and S1002, as part of a normal response as illustrated in FIG. 16B, to the client apparatus 2000 via the communication unit 1005.

Figure 11:
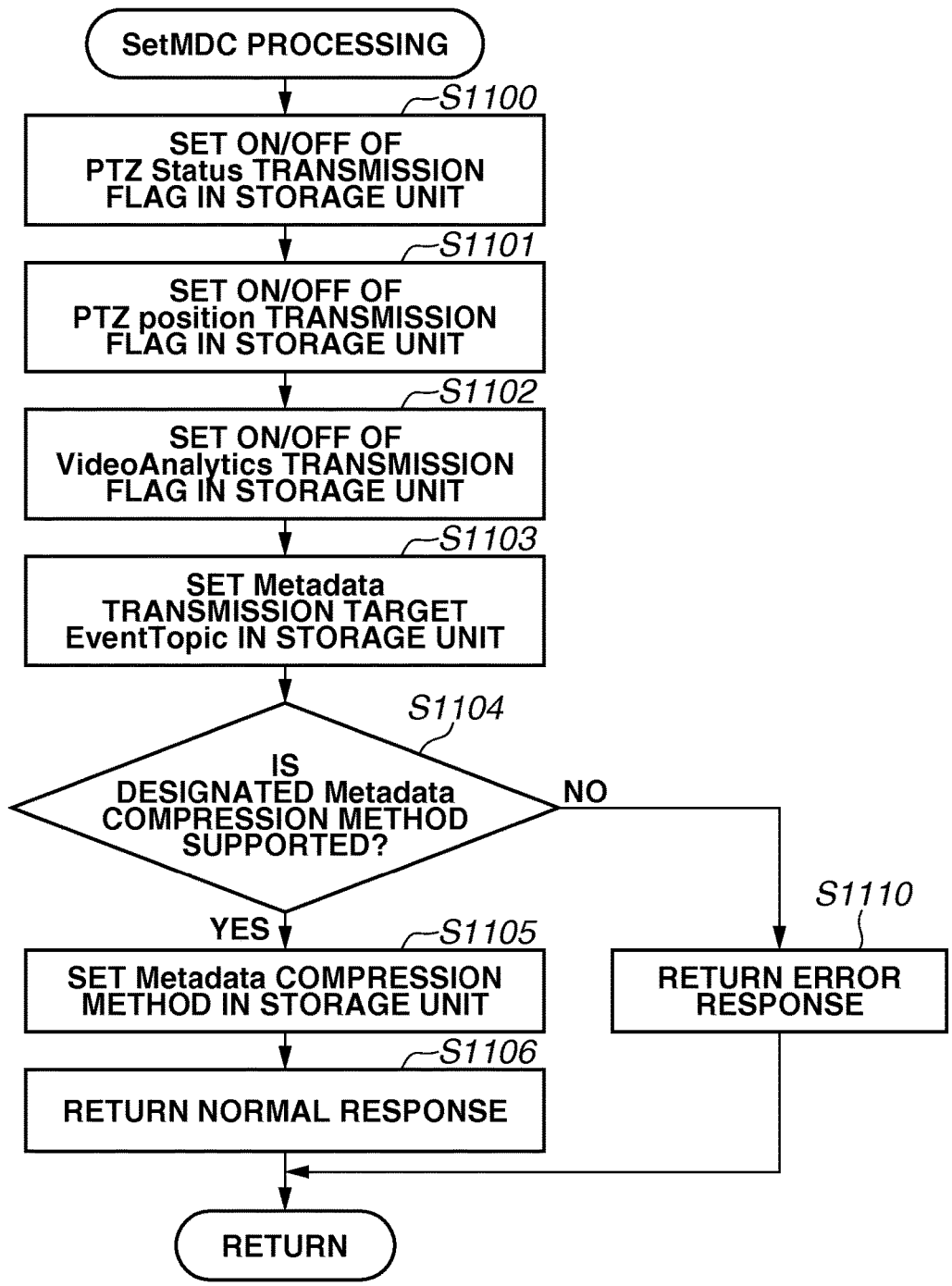
FIG. 11 is a flowchart illustrating the behavior of the monitoring camera in the reception of a SetMetadataConfiguration command according to the first exemplary embodiment.

FIG. 11 illustrates example processing that can be performed by the monitoring camera 1000 when the monitoring camera 1000 receives the above-mentioned SetMDC command from the client apparatus 2000.

In step S1100, the control unit 1001 stores the contents of the PanTiltStatusSupported flag and the ZoomStatusSupported flag, as the PTZStatus transmission flag, in the storage unit 1002. In the present exemplary embodiment, both of the PanTiltStatusSupported flag and the ZoomStatusSupported flag can be designated using an argument of the SetMDC command.

When the PTZStatus transmission flag is True, the imaging control unit 1006 periodically transmits status information about the panning mechanism, the tilting mechanism, or the zooming mechanism, together with a PTZStatus transmission trigger, to the control unit 1001. On the other hand, when the PTZStatus transmission flag is False, the imaging control unit 1006 periodically transmits only the PTZStatus transmission trigger to the control unit 1001 without including the status information.

In step S1101, the control unit 1001 causes the storage unit 1002 to store the contents of the PanTiltPositionSupported flag and the ZoomPositionSupported flag, as the PTZPosition transmission flag. In the present exemplary embodiment, both of the PanTiltPositionSupported flag and the ZoomPositionSupported flag can be designated using the argument of the SetMDC command.

When the PTZPosition transmission flag is True, the imaging control unit 1006 periodically transmits position information about the panning mechanism, the tilting mechanism, or the zooming mechanism, together with the PTZStatus transmission trigger, to the control unit 1001. On the other hand, when the PTZPosition transmission flag is False, the imaging control unit 1006 periodically transmits only the PTZStatus transmission trigger to the control unit 1001 without including the position information.

In step S1102, the control unit 1001 causes the storage unit 1002 to store the contents of the Analytics flag designated using the argument of the SetMDC command as VideoAnalyticstransmission flag.

When the VideoAnalyticstransmission flag is True, the image analysis unit 1007 periodically transmits object information including a detection result of an object included in an image, together with the image analysis result transmission trigger, to the control unit 1001. On the other hand, when the VideoAnalyticstransmission flag is False, the image analysis unit 1007 periodically transmits only the image analysis result transmission trigger to the control unit 1001 without including the object information.

In step S1103, the control unit 1001 causes the storage unit 1002 to store the contents of the Events designated using the argument of the SetMDC command as metadata transmission target EventTopic.

For example, it is feasible to designate "moving body detection" EventTopic. When the designated EventTopic is the "moving body detection" EventTopic, the image analysis unit 1007 transmits a moving body detection occurrence trigger to the control unit 1001 if the image analysis unit 1007 detects a moving object in an image. On the other hand, when the designated EventTopic is not the "moving body detection" EventTopic, the image analysis unit 1007 does not transmit the moving body detection occurrence trigger to the control unit 1001 even when the image analysis unit 1007 detects a moving object in an image.

In step S1104, the control unit 1001 determines whether the compression method CompressionType designated using the argument of the SetMDC command is currently supported. More specifically, the control unit 1001 determines whether the compression method list that the control unit 1001 has acquired from the storage unit 1002 in step S1002 includes the compression method CompressionType designated using the argument of the SetMDC command.

If it is determined that the compression method list includes the designated compression method CompressionType (NO in step S1104) which is not supported, the operation of the control unit 1001 proceeds to step S1110. If it is determined that the compression method list includes the designated compression method CompressionType (YES in step S1104) which is supported, the operation of the control unit 1001 proceeds to step S1105.

In step S1105, the control unit 1001 causes the storage unit 1002 to store the compression method CompressionType designated using the argument of the SetMDC command.

In step S1106, the control unit 1001 transmits a normal response to the client apparatus 2000 via the communication unit 1005.

In step S1110, the control unit 1001 transmits an error response to the client apparatus 2000 via the communication unit 1005.

Figure 12:
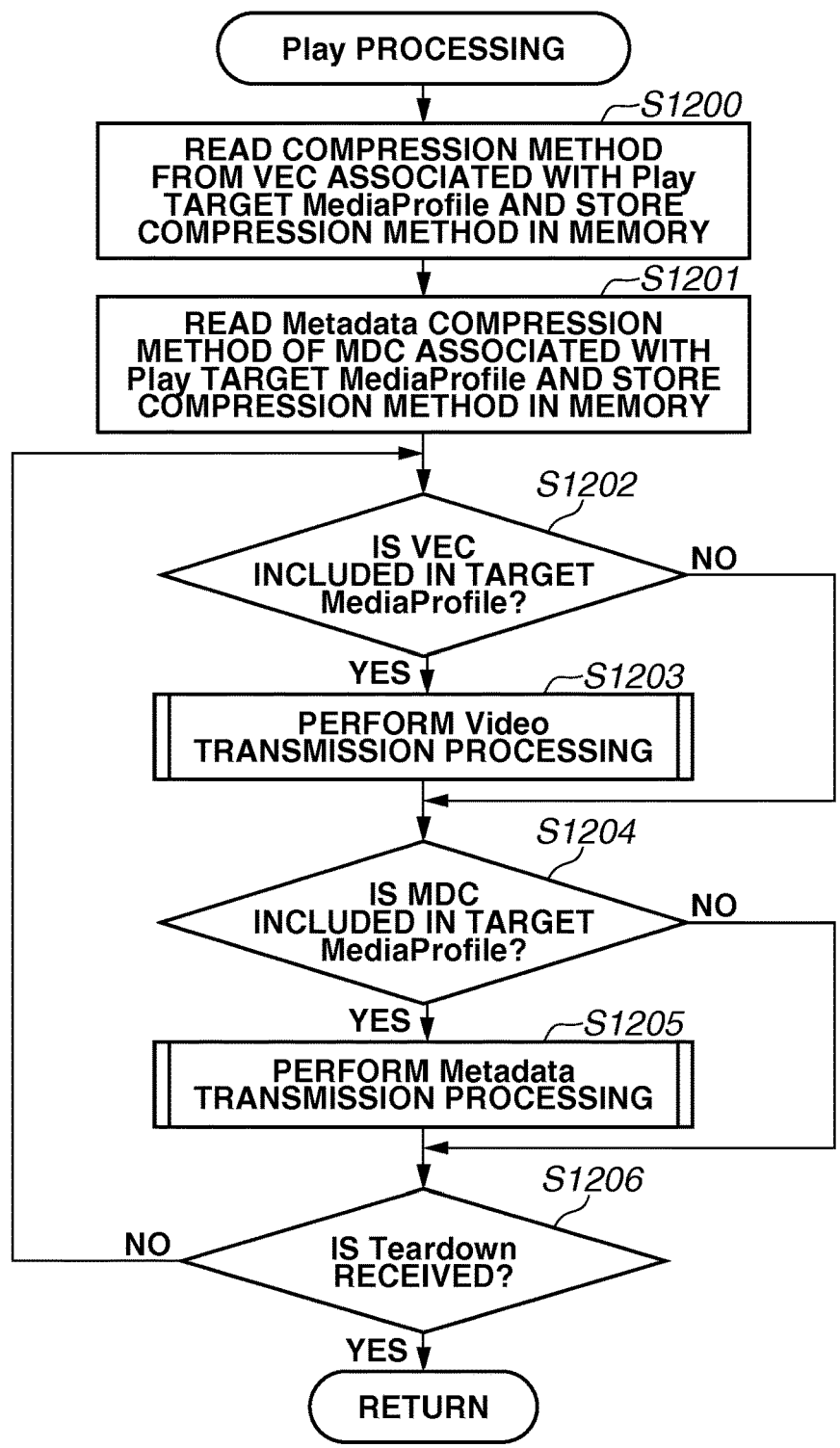
FIG. 12 is a flowchart illustrating the behavior of the monitoring camera in the reception of a Play command according to the first exemplary embodiment.

FIG. 12 illustrates example processing that can be performed by the monitoring camera 1000 when the monitoring camera 1000 receives the above-mentioned Play command from the client apparatus 2000.

In step S1200, the control unit 1001 stores a compression method applied to a target video stream of the Play command in a memory of the storage unit 1002.

More specifically, the control unit 1001 identifies a Play target media profile and VEC based on URI and session ID information designated by the Play command. Then, the control unit 1001 saves the referred compression method in the memory of the storage unit 1002 with reference to the identified VEC compression method.

In step S1201, the control unit 1001 stores a compression method of the target metadata stream of the Play command in the memory of the storage unit 1002.

More specifically, the control unit 1001 identifies the Play target media profile and MDC based on the URI and session ID information designated by the Play command. Then, the control unit 1001 saves the referred compression method in the memory of the storage unit 1002 with reference to the identified MDC compression method.

The video and metadata compression methods saved in the memory in steps S1200 and S1201 can be referred to by the control unit 1001 in Video distribution processing or metadata distribution processing, which are described in detail below, during the streaming distribution. The above-mentioned processing intends to prevent the compression method saved in the storage unit 1002 from being directly referred to in the SetVEC or SetMDC command processing.

The above-mentioned processing prevents the compression method from being changed by the SetVEC or SetMDC command received during the streaming distribution after the streaming is started. Accordingly, the processing in steps S1200 and S1201 can be modified in such a way as to save an additional parameter, other than the compression method that prevents the settings from being changed during the streaming, in the memory. For example, it is feasible to save the output resolution of the setting item VEC.

In step S1202, the control unit 1001 determines whether the Play target media profile includes the setting item VEC. More specifically, the control unit 1001 determines whether the distribution target is a video. If it is determined that the setting item VEC is not included, namely, when the distribution target is not a video (NO in step S1202), the operation of the control unit 1001 proceeds to step S1204. On the other hand, if it is determined that the setting item VEC is included, namely when the distribution target is a video (YES in step S1202), the operation of the control unit 1001 proceeds to step S1203.

In step S1203, the control unit 1001 performs Video transmission processing to distribute the video. The Video transmission processing is described in detail below with reference to FIG. 13.

In step S1204, the control unit 1001 determines whether the Play target media profile includes the setting item MDC. More specifically, the control unit 1001 determines whether the distribution target is a metadata. If it is determined that the setting item MDC is not included, namely, when the distribution target is not the metadata (NO in step S1204), the operation of the control unit 1001 proceeds to step S1206. On the other hand, if it is determined that the setting item MDC is included, namely when the distribution target is the metadata (YES in step S1204), the operation of the control unit 1001 proceeds to step S1205.

In step S1205, the control unit 1001 performs metadata transmission processing to distribute the metadata. The metadata transmission processing is described in detail below with reference to FIG. 14.

In step S1206, the control unit 1001 inquires the communication unit 1005 if the Teardown command directed to the currently distributing streaming has been received. If it is determined that the Teardown command has been received (YES in step S1206), the control unit 1001 terminates the processing of the flowchart illustrated in FIG. 12 to stop the streaming distribution. If it is determined that the Teardown command has not been received (NO step S1206), the operation of the control unit 1001 returns to step S1202 to continue the streaming distribution.

Figure 13:
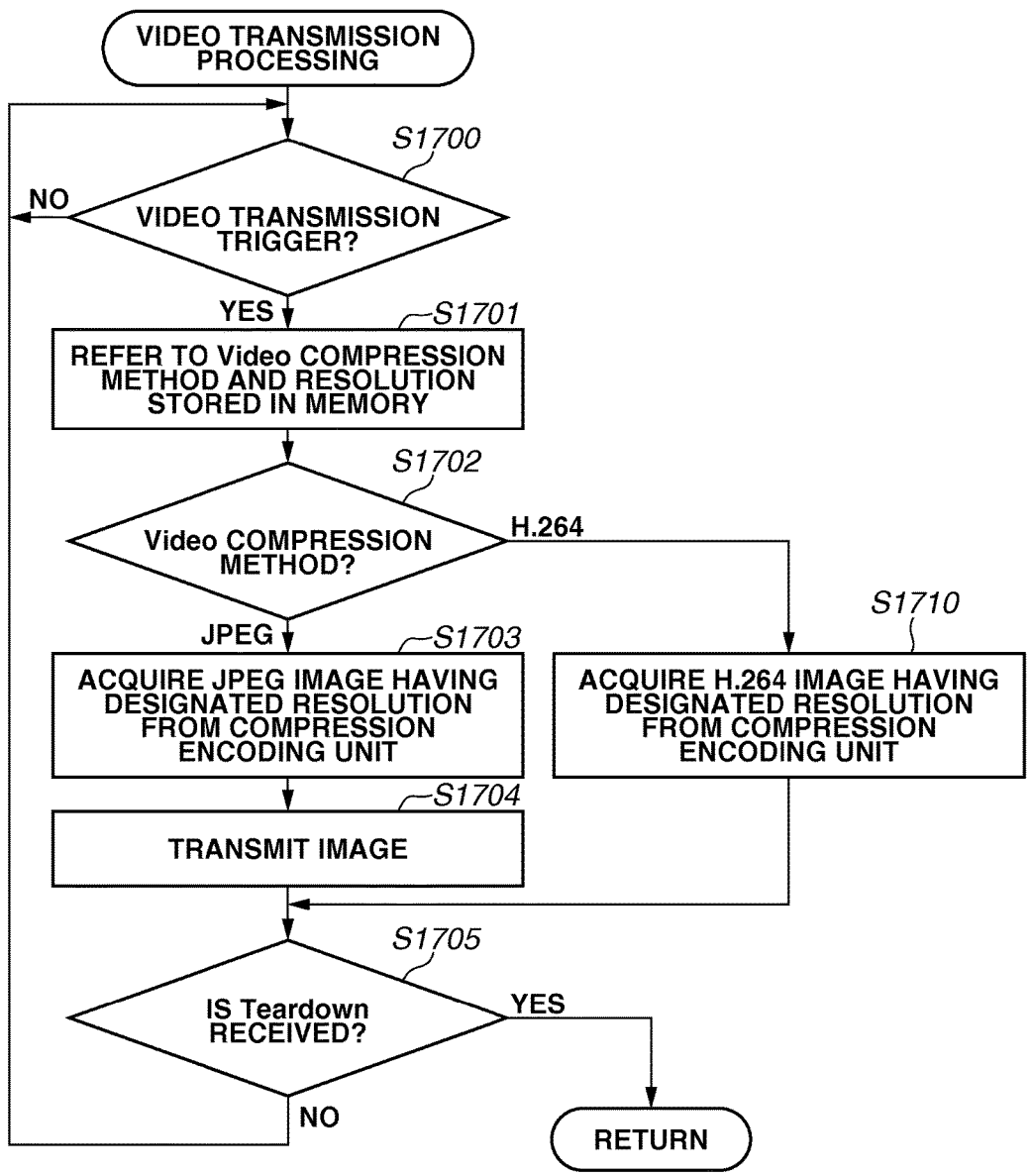
FIG. 13 is a flowchart illustrating the behavior of the monitoring camera in Video transmission processing according to the first exemplary embodiment.

FIG. 13 illustrates details of the Video transmission processing. In step S1700, the control unit 1001 determines whether the VIDEO transmission trigger is present. If it is determined that the VIDEO transmission trigger is present (YES in step S1700), the operation of the control unit 1001 proceeds to step S1701. On the other hand, if it is determined that the VIDEO transmission trigger is not present (NO in step S1700), the control unit 1001 repeats the above-mentioned VIDEO transmission trigger generation confirmation processing a predetermined number of times.

The flowchart illustrated in FIG. 13 can be modified in such a manner that the operation directly proceeds to Return when the VIDEO transmission trigger is not present. The control unit 1001 can terminate the processing of the flowchart illustrated in FIG. 13. It may be also useful that the control unit 1001 performs the VIDEO transmission trigger presence determination processing in step S1700 only one time.

In step S1701, the control unit 1001 acquires the compression method and the output resolution of the currently streaming image (i.e., streaming distribution image) with reference to the memory included in the storage unit 1002.

In step S1702, the control unit 1001 identifies the compression method of the currently streaming image acquired in step S1701. If it is determined that the compression method is JPEG, the operation of the control unit 1001 proceeds to step S1703. If it is determined that the compression method is H.264, the operation of the control unit 1001 proceeds to step S1710.

In step S1703, the control unit 1001 acquires a JPEG image having the output resolution acquired in step S1701 from the compression encoding unit 1004.

In step S1710, the control unit 1001 acquires an H.264 image having the output resolution acquired in step S1701 from the compression encoding unit 1004.

The compression methods in steps S1702, S1703, and S1710 are not limited to JPEG and H.264. For example, the control unit 1001 can perform similar processing even when the currently supporting compression methods are MPEG4 and HEVC (H.265).

In step S1704, the control unit 1001 transmits the image acquired in step S1703 or step S1710 to an external apparatus via the communication unit 1005.

In step S1705, the control unit 1001 inquires the communication unit 1005 if the Teardown command directed to the currently distributing streaming has been received. If it is determined that the Teardown command has been received (YES in step S1705), the control unit 1001 terminates the processing of the flowchart illustrated in FIG. 13. On the other hand, if it is determined that the Teardown command has not been received (NO in step S1705), the operation of the control unit 1001 returns to step S1700 to continue the above-mentioned processing a predetermined number of times.

However, the Play processing illustrated in FIG. 12 includes the Teardown command reception confirmation. Therefore, it is unnecessary to always perform the above-mentioned confirmation in the VIDEO transmission processing.

Figure 14:
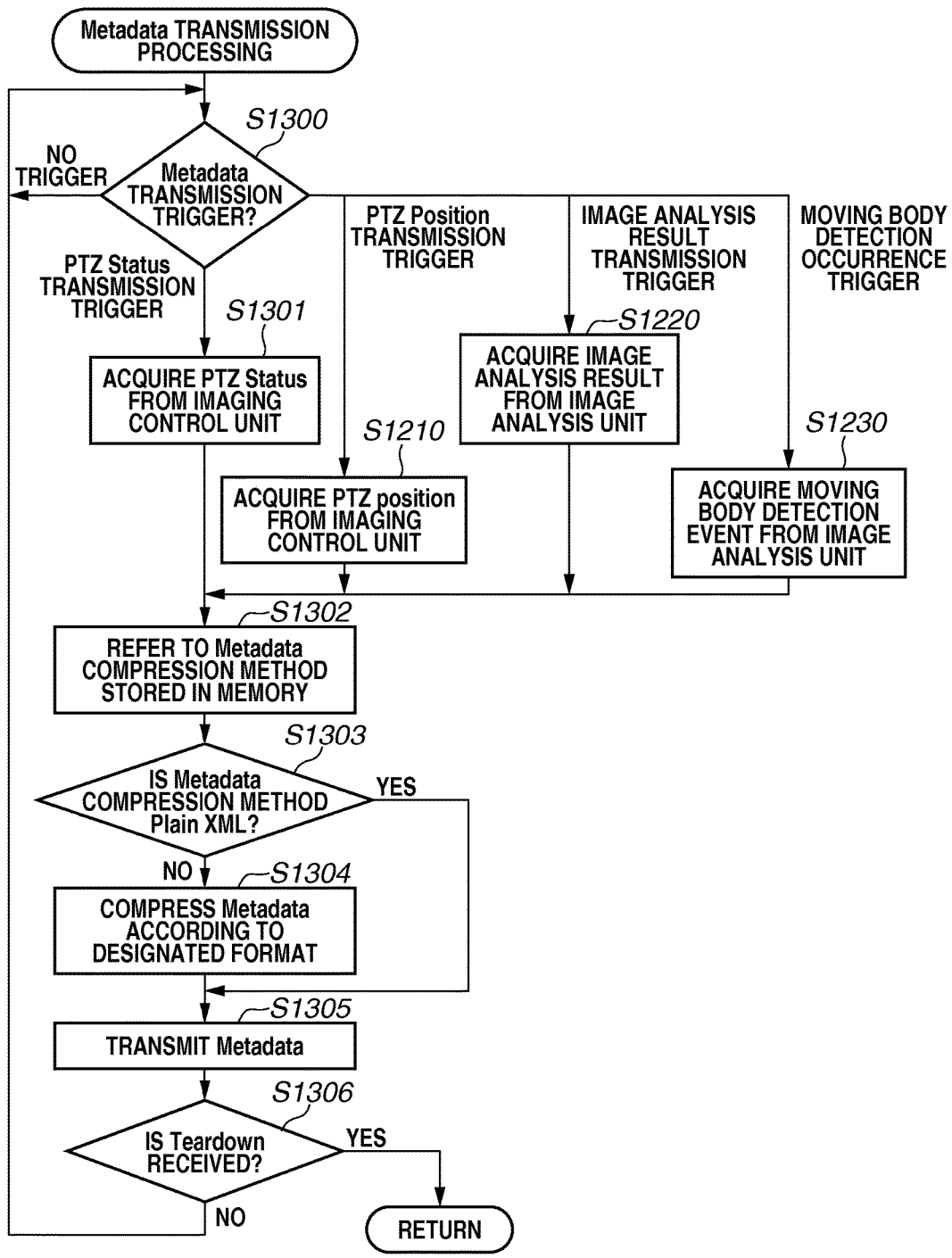
FIG. 14 is a flowchart illustrating the behavior of the monitoring camera in Metadata transmission processing according to the first exemplary embodiment.

FIG. 14 illustrates details of the metadata transmission processing. In step S1300, the control unit 1001 determines whether there is any metadata transmission trigger. If the presence of a metadata transmission trigger is confirmed, the operation of the control unit 1001 proceeds to step S1301, step S1210, step S1220, or step S1230 according to the content of the trigger.

On the other hand, if there is not any metadata transmission trigger, the control unit 1001 repeats the above-mentioned metadata transmission trigger presence confirmation processing a predetermined number of times. The flowchart illustrated in FIG. 14 can be modified in such a manner that the operation directly proceeds to Return when the metadata transmission trigger is not present. The control unit 1001 can terminate the processing of the flowchart illustrated in FIG. 14. It may be also useful that the control unit 1001 performs the metadata transmission trigger presence confirmation processing in step S1300 only one time.

For example, the metadata transmission triggers to be identified in step S1300 include the following four types. The control unit 1001 can receive the PTZStatus transmission trigger or a PTZPosition transmission trigger from the imaging control unit 1006. The control unit 1001 can receive a VideoAnalytics transmission trigger or a moving body detection event transmission trigger from the image analysis unit 1007.

For example, if the control unit 1001 determines that the notified metadata transmission trigger is the PTZStatus transmission trigger, the operation proceeds to step S1301. Further, if the control unit 1001 determines that the notified metadata transmission trigger is the PTZPosition transmission trigger, the operation proceeds to step S1210.

Then, if the control unit 1001 determines that the notified metadata transmission trigger is the image analysis result transmission trigger, the operation proceeds to step S1220. Further, if the control unit 1001 determines that the notified metadata transmission trigger is the moving body detection occurrence trigger, the operation proceeds to step S1230.

In step S1301, the control unit 1001 acquires XML format PTZ Status information from the imaging control unit 1006. FIG. 17 illustrates an example of an XML format metadata document. In FIG. 17, the data defined using tev8:MoveStatus tag is the PTZ Status information to be acquired in step S1301.

More specifically, the PTZ Status information illustrated in FIG. 17 is the data associated with the MoveStatus tag, which is discriminated using <tev8:MoveStatus> tag and </tev8:MoveStatus> tag. More specifically, the above-mentioned PTZ Status information is "<tev8:PanTilt>IDLE</tev8:PanTilt>" and "<tev8:Zoom>IDLE</tev8:Zoom>."

In step S1210, the control unit 1001 acquires XML format PTZ Position information from the imaging control unit 1006. In FIG. 17, the data defined using tev8:Position tag is the PTZ Position information to be acquired in step S1210.

More specifically, the PTZ Position information illustrated in FIG. 17 is the data associated with the tev8:Position tag, which is discriminated using <tev8:Position> tag and </tev8:Position> tag.

In step S1220, the control unit 1001 acquires XML format object information from the image analysis unit 1007. In FIG. 17, the data defined using tev8:Object tag is the object information to be acquired in step S1220.

More specifically, the object information illustrated in FIG. 17 is the data associated with the tev8:Object tag, which is discriminated using <tev8:Object> tag and </tev8:Object> tag.

In step S1230, the control unit 1001 acquires XML format moving body detection event information from the image analysis unit 1007.

In step S1302, the control unit 1001 refers to the metadata compression method saved in the memory in step S1201.

In step S1303, the control unit 1001 determines whether the metadata compression method acquired in step S1302 is None, namely, non-compression Plain XML. Then, if it is determined that the acquired metadata compression method is the non-compression Plain XML (YES in step S1303), the operation of the control unit 1001 proceeds to step S1305. On the other hand, if it is determined that the acquired metadata compression method is not the non-compression Plain XML (NO in step S1303), the operation of the control unit 1001 proceeds to step S1304.

In step S1304, the control unit 1001 compresses the XML format metadata acquired in step S1301, S1210, S1220, or S1230 according to the compression method acquired in step S1302.

In step S1305, the control unit 1001 transmits the metadata acquired in step S1301, S1210, S1220, or S1230 to an external device via the communication unit 1005.

For example, if it is determined that the metadata compression method identified in step S1303 is None, the control unit 1001 transmits the metadata to an external device without compressing the metadata. If it is determined that the metadata compression method identified in step S1303 is not None, the control unit 1001 transmits the metadata compressed in step S1304 to an external device.

In step S1306, the control unit 1001 inquires the communication unit 1005 if the Teardown command directed to the currently distributing streaming has been received. If it is determined that the Teardown command has been received (YES in step S1306), the control unit 1001 terminates the processing of the flowchart illustrated in FIG. 14. On the other hand, if it is determined that the Teardown command has not been received (NO in step S1306), the operation of the control unit 1001 returns to step S1300 to continue the above-mentioned processing a predetermined number of times.

However, the Play processing illustrated in FIG. 12 includes the Teardown command reception confirmation. Therefore, it is unnecessary to always perform the above-mentioned confirmation in the metadata transmission processing.

Figure 19:
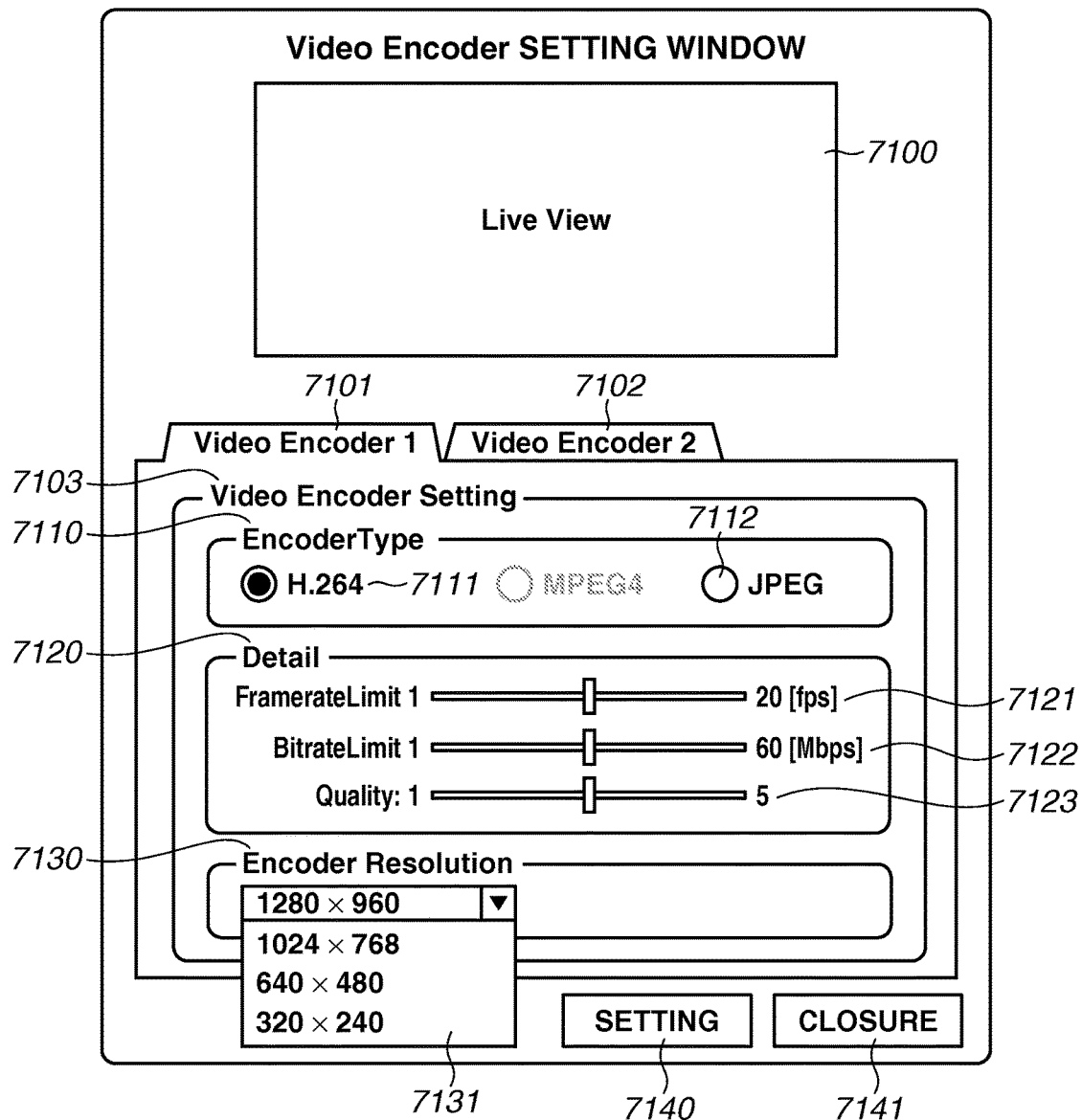
FIG. 19 illustrates a VideoEncoder setting window GUI according to the first exemplary embodiment.
Figure 21:
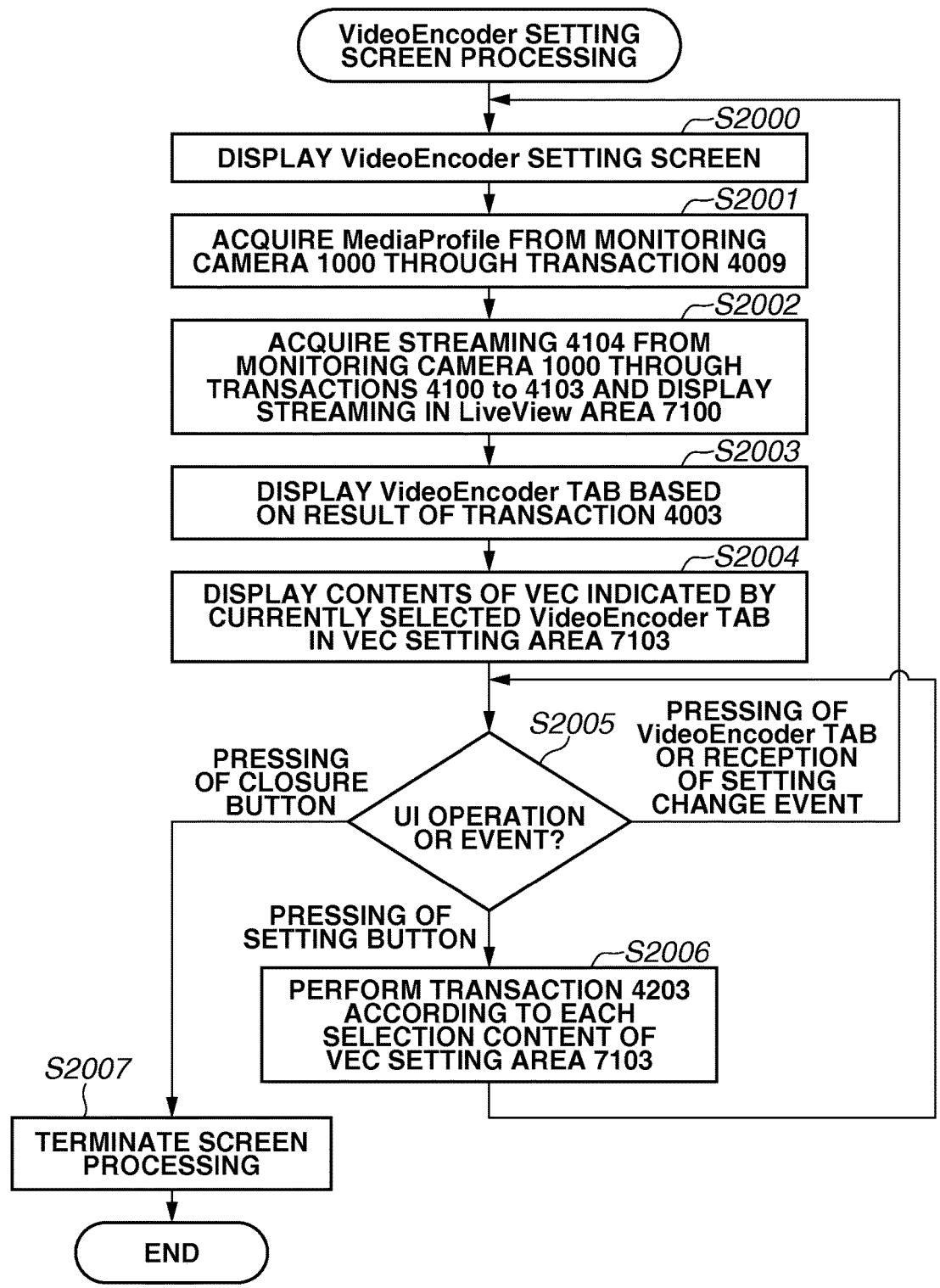
FIG. 21 is a flowchart illustrating the behavior of the client apparatus in VideoEncoder setting screen processing according to the first exemplary embodiment.

FIG. 19 illustrates a VideoEncoder setting window, which is a user interface that enables a user of the client apparatus 2000 to change the VEC settings for the monitoring camera 1000. FIG. 21 is a flowchart illustrating example behavior of the client apparatus 2000 relating to the screen illustrated in FIG. 19.

In step S2000, the control unit 2001 causes the display unit 2003 to display the VideoEncoder setting window.

In step S2001, the control unit 2001 acquires the media profile list from the monitoring camera 1000, by performing the transaction 4099 relating to the GetProfiles command, via the communication unit 2006. Then, the control unit 2001 causes the storage unit 2002 to store the acquired list.

In addition, the control unit 2001 performs the transaction 4201 relating to the GetVECOptions command via the communication unit 2006. Then, the control unit 2001 displays a plurality of options in an EncoderType selection area 7110 together with selection states of the plurality of options, based on the option of each VEC parameter included in the GetVECOptions response obtainable through the above-mentioned processing.

Further, the control unit 2001 displays a plurality of options in a Details setting area 7120 and an output resolution selection area 7130, based on the option of each VEC parameter included in the above-mentioned response.

In step S2002, the control unit 2001 performs the transactions 4100 to 4103 for one of the media profiles acquired as a target in step S2001. Thus, the client apparatus 2000 acquires the streaming from the monitoring camera 1000 (see transaction 4104). The client apparatus 2000 displays a moving image corresponding to the streaming acquired through the transaction 4104 in a LiveView area 7100.

In step S2003, the control unit 2001 displays VEC tabs based on the number of VECs acquired through the transaction 4003 relating to the GetVECs command via the communication unit 2006. According to the example illustrated in FIG. 19, two VEC tabs 7101 and 7102 are displayed based on the acquisition of two VECs.

In step S2004, the control unit 2001 displays the contents of one of the VECs acquired in step S2003, which is currently selected in the VEC tab, in a VEC display area 7103. More specifically, the control unit 2001 displays the content of Encording included in the VEC, as being in a selected state, in the EncoderType selection area 7110.

Further, the control unit 2001 displays the content of each VEC parameter, as being in a selected state, in the Details setting area 7120 and in the output resolution selection area 7130. The Details setting area 7120 includes a sliding bar 7121 corresponding to FrameLimit, a sliding bar 7122 corresponding to BitrateLimit, and a sliding bar 7123 corresponding to Quality setting in the in VEC.

Further, the output resolution selection area 7130 includes a dropdown list 7131 that can display selectable values with respect to the output resolution acquired in step S2001.

In step S2005, the control unit 2001 waits for an UI operation notification to be received via the input unit 2004 or a setting change notification event to be received from the monitoring camera 1000 via the communication unit 2006.

If it is determined that the VEC tab 7101 or 7102 has been pressed or if it is determined that the setting change notification event has been received from the monitoring camera 1000, the operation of the control unit 2001 returns to step S2000. Further, if the pressing of a setting button 7140 is notified, the operation of the control unit 2001 proceeds to step S2006. If the pressing of a closure button 7141 is notified, the operation of the control unit 2001 proceeds to step S2007 and terminates the screen processing illustrated in FIG. 21.

In step S2006, the control unit 2001 performs the transaction 4203 relating to the SetVEC command according to the contents of the VEC display area 7103, via the communication unit 2006.

For example, the control unit 2001 transmits the SetVEC command with parameters representing the contents having been selected by a user from the EncoderType selection area 7110, the Details setting area 7120, and the output resolution selection area 7130 to the monitoring camera 1000. Subsequently, the operation of the control unit 2001 returns to step S2005.

Figure 20:
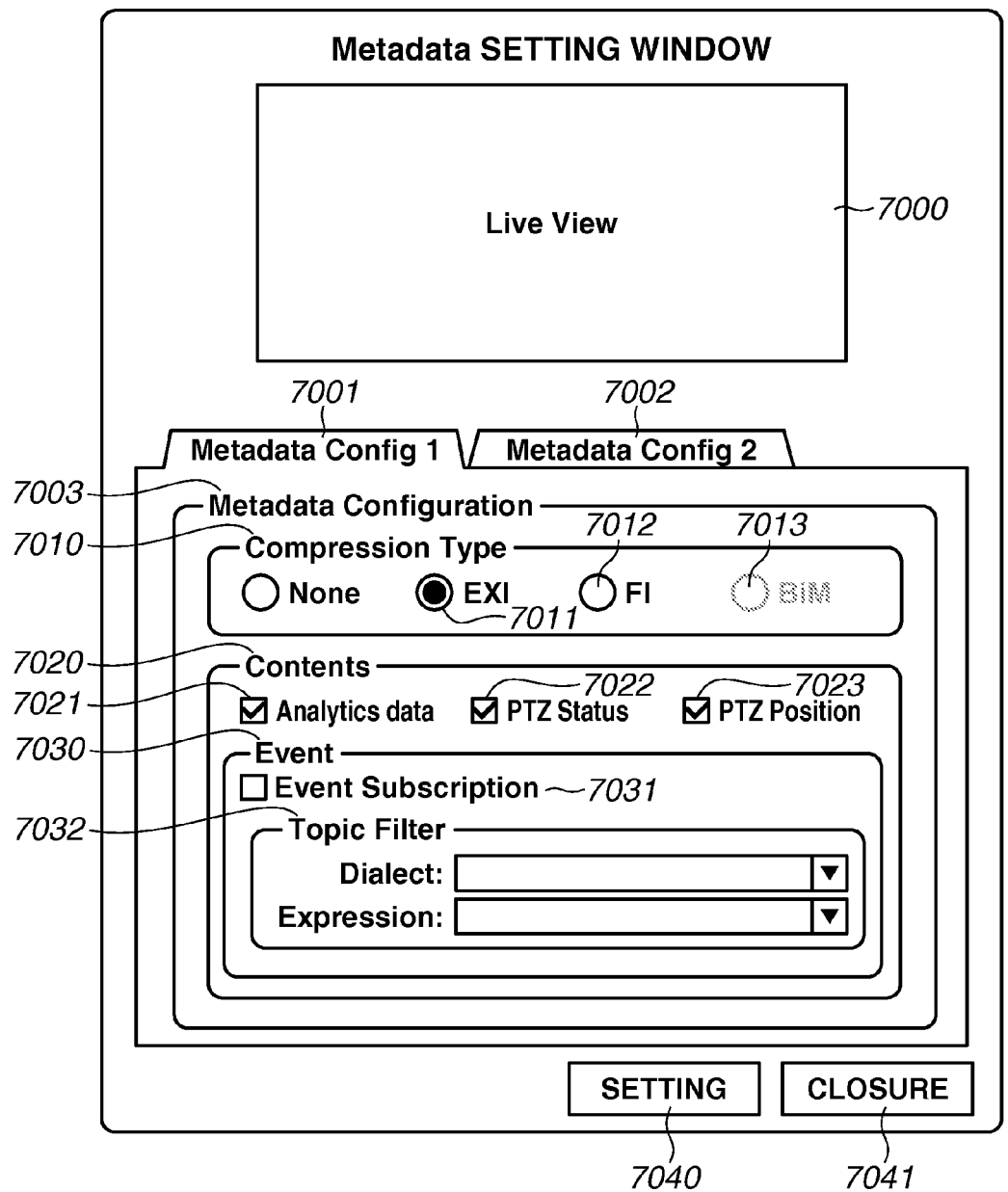
FIG. 20 illustrates a Metadata setting window GUI according to the first exemplary embodiment.
Figure 22:
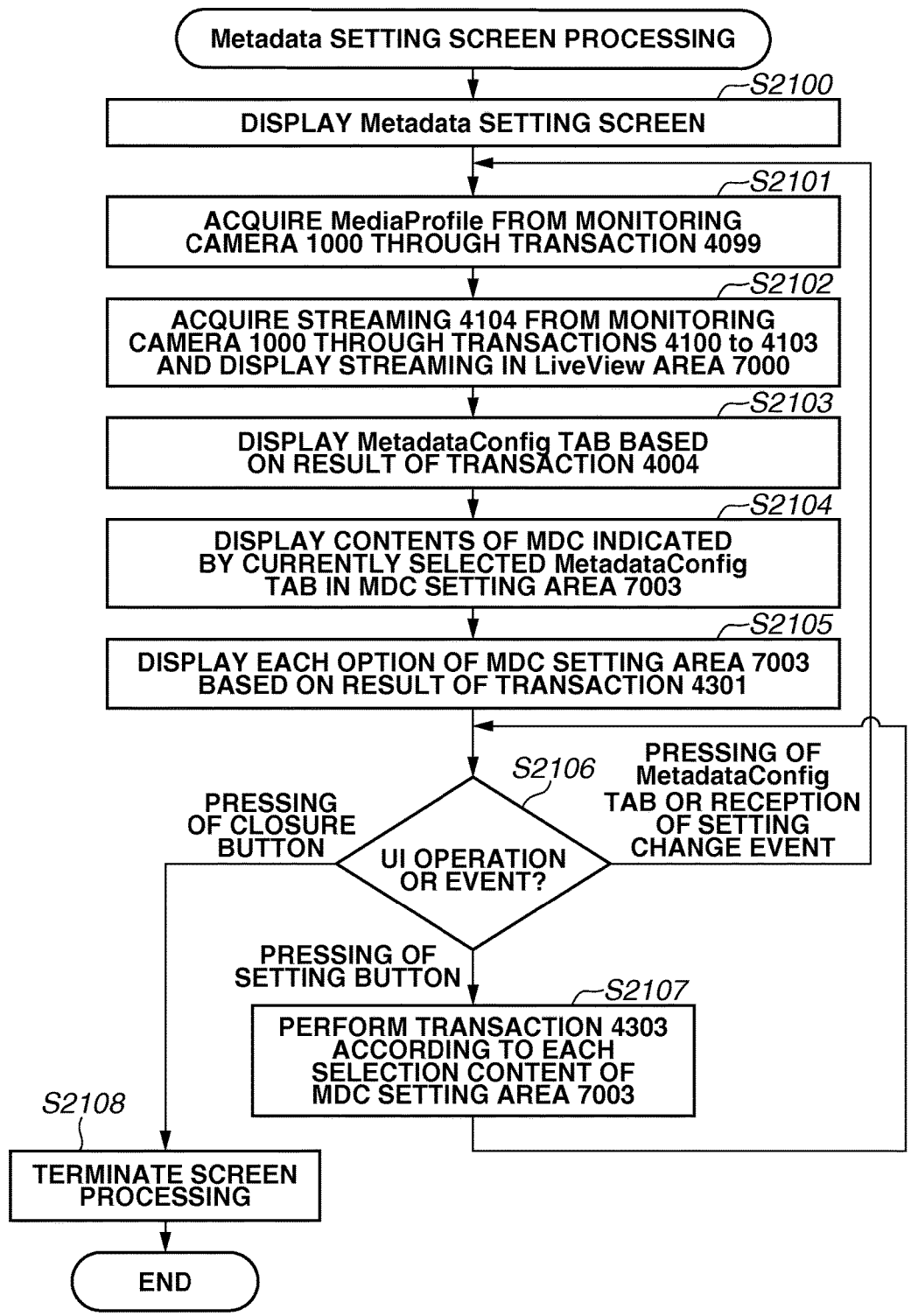
FIG. 22 is a flowchart illustrating the behavior of the client apparatus in Metadata setting screen processing according to the first exemplary embodiment.

FIG. 20 illustrates a Metadata setting window, which is a user interface that enables a user of the client apparatus 2000 to change the MDC settings of the monitoring camera 1000. Further, FIG. 22 is a flowchart illustrating example behavior of the client apparatus 2000 relating to the screen illustrated in FIG. 20.

In step S2100, the control unit 2001 causes the display unit 2003 to display the Metadata setting window.

In step S2101, the control unit 2001 acquires the media profile list from the monitoring camera 1000, by performing the transaction 4099 relating to the GetProfiles command, via the communication unit 2006. Then, the control unit 2001 causes the storage unit 2002 to store the acquired list.

In step S2102, the control unit 2001 performs the transactions 4100 to 4103 for one of the media profiles acquired as a target in step S2001. Thus, the client apparatus 2000 acquires the streaming from the monitoring camera 1000 (see transaction 4104). The control unit 2001 displays a content corresponding to the streaming acquired through the transaction 4104 in a LiveView area 7000.

In step S2103, the control unit 2001 displays MDC tabs based on the number of MDCs acquired through the transaction 4004 relating to the GetMDCs command via the communication unit 2006. FIGS. 15A and 15B illustrate a request and a response relating to the GetMDCs command. According to the example illustrated in FIG. 20, two MDC tabs 7001 and 7002 are displayed based on the acquisition of two MDCs illustrated in FIG. 15B.

In step S2104, the control unit 2001 displays the contents of one of the MDCs acquired in step S2103, which is currently selected in the MDC tab, in an MDC display area 7003.

More specifically, the control unit 2001 displays the contents of CompressionType included in the MDC in the MDC display area 7003, to be in a selected state in a CompressionType selection area 7010. According to the example illustrated in FIG. 20, EXI 7011 is selected because of setting of EXI as indicated by a CompressionType tag 10000 illustrated in FIG. 15B.

On the other hand, if None is designated as illustrated in FIG. 15B (see 10001), None is displayed in a selected state in the CompressionType selection area 7010. In the present exemplary embodiment, the CompressionType selection area 7010 may be referred to as a compression method selection area.

Further, the control unit 2001 displays the contents of respective MDC parameters, as being selected, in a Contents setting area 7020. According to the example illustrated in FIG. 20, each of the PTZ Status flag, the PTZ Position flag, and the Analytics flag is in a selected state. In the present exemplary embodiment, the Contents setting area 7020 may be referred to as a details setting area.

An Events setting area 7030, in which an event topic is designated, includes an event data option field 7031 and a topic filter setting area 7032 in which the topic is designated. According to the example illustrated in FIG. 20, no event is set.

In step S2105, the control unit 2001 performs the transaction 4301 relating to the GetMDCOptions command via the communication unit 2006. Then, the control unit 2001 displays each option in the MDC display area 7003 based on the option of each MDC parameter included in the GetMDCOptions response acquired through the above-mentioned processing.

More specifically, the control unit 2001 displays the option of metadata compression method in the compression method selection area 7010 and the selectability of a PTZ Status option 7022 and a PTZ Position option 7023 in the details setting area 7020.

In the example illustrated in FIG. 20, three options of None, EXI, and FI are displayed in a settable state in the compression method selection area 7010. In other words, only one (i.e., BiM 7013) of four types of metadata compression methods defined beforehand is not selectable. Further, according to the example illustrated in FIG. 20, both of the PTZ Status option 7022 and the PTZ Position option 7023 in the details setting area 7020 are displayed in such a manner that these options can be designated.

The control unit 2001 according to the present exemplary embodiment is functionally operable as a display control unit configured to cause the display unit 2003 to display the compression method that can be set to the metadata output from the monitoring camera 1000 together with the information (such as PTZStatus information) included in the metadata.

In step S2106, the control unit 2001 waits for an UI operation notification to be received via the input unit 2004 or a setting change notification event to be received from the monitoring camera 1000 via the communication unit 2006. If it is determined that the MDC tab 7001 or 7002 has been pressed or if it is determined that the setting change notification event has been received from the monitoring camera 1000, the operation of the control unit 2001 proceeds to step S2101.

Further, if the pressing of a setting button 7040 is notified, the operation of the control unit 2001 proceeds to step S2107. If the pressing of a closure button 7041 is notified, the operation of the control unit 2001 proceeds to step S2108 and terminates the screen processing illustrated in FIG. 22.

In step S2107, the control unit 2001 performs the transaction 4302 relating to the SetMDC command according to the contents of the MDC display area 7003, via the communication unit 2006.

More specifically, the control unit 2001 transmits the SetMDC command with parameters representing the contents selected by a user from the CompressionType selection area 7010 and the Contents setting area 7020 to the monitoring camera 1000. Subsequently, the operation of the control unit 2001 returns to step S2106.

According to the monitoring camera, the client apparatus, and the imaging system described above, it is feasible to share the compressibility of an XML document when the XML document is transmitted between the monitoring camera and the client apparatus. Further, when the compressibility of an XML document is confirmed, it is feasible for the client apparatus to designate a format expected for the compression, which is used by the monitoring camera 1000. More specifically, it is feasible to share the compression method for an XML document between the monitoring camera and the client apparatus beforehand. Thus, it is feasible to enable a user of the client apparatus to correctly read an XML document output from the monitoring camera apparatus.

In the present exemplary embodiment, as illustrated in FIG. 16B, both of the PanTiltPositionSupported flag and the ZoomPositionSupported flag are "True." However, these flags are not limited to the above-mentioned examples. For example, both of the PanTiltPositionSupported flag and the ZoomPositionSupported flag can be "False" (i.e., "not supported"). Further, one of the above-mentioned flags can be "True" and the other can be "False."

Accordingly, in the present exemplary embodiment, the GetMDCOptions response is an example of information indicating whether the information indicating the operating states of the panning mechanism, the tilting mechanism, and the zooming mechanism can be included in the metadata output from the monitoring camera 1000.

Similarly, in the present exemplary embodiment, as illustrated in FIG. 16B, both the PanTiltPositionSupported flag and the ZoomPositionSupported flag are "True." However, these flags are not limited to the above-mentioned examples. For example, both of the PanTiltPositionSupported flag and the ZoomPositionSupported flag can be "False" (i.e., "not supported"). Further, one of the above-mentioned flags can be "True" and the other can be "False."

Accordingly, in the present exemplary embodiment, the GetMDCOptions response is an example of information indicating whether the information indicating the image capturing position of the monitoring camera 1000 can be included in the metadata output from the monitoring camera 1000.

Further, in the present exemplary embodiment, the GetMDCOptions response can be configured as information indicating whether the information indicating an object (e.g., a moving body) detected by the image analysis unit 1007 can be included in the metadata output from the monitoring camera 1000.

Further, as described in the present exemplary embodiment, the control unit 2001 is configured to display an encoding method that can be set to an image output from the monitoring camera 1000 and an encoding method that can be set to a metadata output from the monitoring camera 1000 on different screens. However, the configuration of the control unit 2001 is not limited to the above-mentioned configuration.

For example, the control unit 2001 can be configured to display the encoding method that can be set to the image output from the monitoring camera 1000 and the encoding method that can be set to the metadata output from the monitoring camera 1000 on the same screen (window).

In the first exemplary embodiment, the monitoring camera, the client apparatus, and the imaging system can share the information about the compressibility of an XML document and the designation of a compression method, using the commands, prior to the distribution of the XML document.

However, there is a client apparatus that has no capability of displaying the above-mentioned setting screens illustrated in FIGS. 19 and 20 and enabling a user to perform the VideoEncoder and metadata settings. A simple client apparatus, if its capability is limited to starting the above-mentioned streaming only, cannot identify the video and metadata compression methods presently set on the monitoring camera through the transactions 4003 and 4004.

Accordingly, a user of the above-mentioned client apparatus may not be able to correctly read an XML document including the metadata streaming output (stream distributed) from the monitoring camera.

Even in the above-mentioned client apparatus, to enable a user to correctly read the XML document, it is useful to transmit the compression format of an XML document from the monitoring camera to the client apparatus in the streaming start transaction.

A second exemplary embodiment is described in detail below considering the foregoing. Components and portions similar to those described in the first exemplary embodiment are denoted by the same reference numerals and redundant description thereof will be avoided. For example, the illustrations in FIGS. 1 to 17 and FIGS. 19 to 22 are similarly applied to the second exemplary embodiment and therefore redundant description thereof will be avoided.

Figure 23:
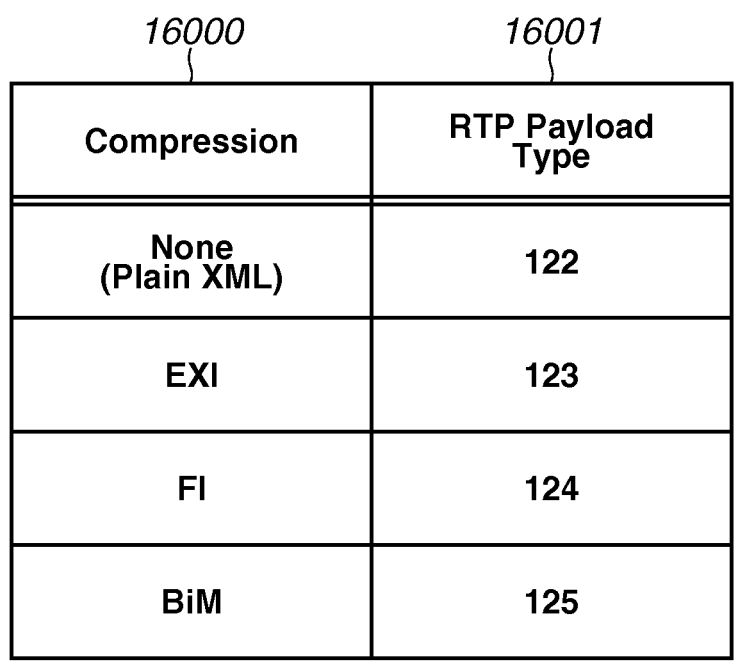
FIG. 23 is a table illustrating the correlation between Metadata compression method and RTP Payload Type according to a second exemplary embodiment.

FIG. 23 is a table illustrating the correlation between Compression 16000 (i.e., metadata (namely, XML document) compression format) and RTP Payload Type 16001. In the present exemplary embodiment, the RTP Payload Type is a code included in the Describe command, which indicates the contents to be notified from the monitoring camera 1000 to the client apparatus 2000.

In the first exemplary embodiment, the numerical value indicating the RTP Payload Type is fixed to "122" regardless of the metadata compression method illustrated in FIG. 18. On the other hand, in the present exemplary embodiment, the numerical value indicating the RTP Payload Type is changeable according to the metadata compression method to be transmitted by the monitoring camera 1000.

Hereinafter, the table illustrated in FIG. 23 is described in detail below. In FIG. 23, "None (Plain XML)" is associated with "122." Further, "EXI" is associated with "123." Further, "FI" is associated with "124." Then, "BiM" is associated with "125."

FIG. 24 illustrates a response to the transaction 4101 relating to the Describe command illustrated in FIG. 5. The response illustrated in FIG. 24 includes data 17000, which is information relating to metadata contents to be provided from the monitoring camera 1000 to the client apparatus 2000. In the data 17000, a numerical value "123" (see 17001 and 17002) indicates the RTP Payload Type. More specifically, based on the numerical value "123", it is understood that the compression format presently applied to the metadata contents is the EXI format.

According to the monitoring camera, the client apparatus, and the imaging system described above, it is feasible to check the metadata compression format before the streaming starts even if the client apparatus is not capable of processing a command group related to metadata settings.

More specifically, the monitoring camera and the client apparatus can share the compression method applied to an XML document beforehand. Therefore, a user of the above-mentioned client apparatus can correctly read an XML document output from the monitoring camera apparatus.

In the present exemplary embodiment, the Describe response includes information about the contents of a metadata to be subjected to the streaming distribution by the monitoring camera 1000, as illustrated in FIG. 24. However, the Describe response is not limited to the above-mentioned example. For example, the Describe response can be configured to include information about the contents of an image to be subjected to the streaming distribution by the monitoring camera 1000.

When the above-mentioned configuration is employed, the communication unit 1005 according to the present exemplary embodiment is functionally operable as an acceptance unit configured to accept a request, with respect to information about the image and metadata contents to be subjected to the streaming distribution by the monitoring camera 1000, from the client apparatus 2000.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-190476 filed Sep. 13, 2013, which is hereby incorporated by reference herein in its entirety.

What is claimed is:

1. An imaging apparatus that communicates with a reception apparatus via a network, comprising:

a camera for capturing an image of an imaging target;

at least one processor for changing at least one of a pan angle, a tilt angle and a zoom magnification of the camera; and the at least one processor transmitting image data based on the image captured by the camera, metadata, and encoding method information to the reception apparatus via the network, wherein the encoding method information indicates options of a compression encoding method for the metadata which is settable to the imaging apparatus, wherein the metadata includes at least one of first information and second information, wherein the first information indicates at least one of the pan angle, the tilt angle and the zoom magnification of the camera, wherein the second information indicates an operating state, wherein the compression encoding method for the metadata is independent from a compression encoding method for the image data, and wherein the compression encoding method includes at least one of Efficient XML Interchange (EXI), Fast Infoset (FI), and Binary MPEG (BiM), wherein, in response to a Get Metadata Configuration Options command from the reception apparatus, the encoding method information is transmitted, wherein transmission of the encoding method information is independent from transmission of the image data, and wherein the transmission of the encoding method information is executed before setting of the compression encoding method for the metadata.

2. The imaging apparatus according to claim 1, further comprising:

the at least one processor accepting a request of content information about the image data and the metadata, from the reception apparatus via the network, wherein information corresponding to the request accepted together with the encoding method information is transmitted.

3. The imaging apparatus according to claim 1, wherein a notification is transmitted about information indicating whether information indicating an image capturing position is included in the metadata, and information indicating whether information indicating an operating state is included in the metadata, together with information indicating a compression encoding method for the metadata, to the reception apparatus via the network.

4. The imaging apparatus according to claim 1, further comprising:

the at least one processor detecting an object included in the image captured, wherein the image data is based on an image captured, and the metadata includes information related to an object detected.

5. The imaging apparatus according to claim 4, wherein the object detected is a moving object.

6. The imaging apparatus according to claim 1, wherein the compression encoding method for the image data includes at least one of JPEG, MPEG4, H.264, and H.265.

7. A reception apparatus that communicates with an imaging apparatus that generates metadata and image data based on an image captured by a camera, to change at least one of a pan angle, a tilt angle and a zoom magnification of the camera, storing encoding method information, and transmitting the image data, the metadata, and the encoding method information via a network, wherein the encoding method information indicates options of a compression encoding method for the metadata which is settable to the imaging apparatus, wherein the metadata includes at least one of the first information and second information, wherein the first information indicates at least one of the pan angle, the title angle and the zoom magnification of the camera, wherein the second information indicates an operating state, and wherein the compression encoding method includes at least one of Efficient XML Interchange (EXI), Fast Infoset (FI), and Binary MPEG (BiM), the reception apparatus comprising:

at least one processor for receiving the image data and the metadata, from the imaging apparatus, via the network, the at least one processor for requesting by transmitting a Get Metadata Configuration Options command to the camera, to transmit the encoding method information via the network, wherein the encoding method information transmitted in response to the Get Metadata Configuration Options command from the camera is received, wherein the encoding method information received is independent from reception of the image data, and wherein the reception of the encoding method information is executed before setting of the compression encoding method for the metadata.

8. The reception apparatus according to claim 7, further comprising:

the at least one processor causing a display to display information indicating a compression encoding method for each of the image data and the metadata when the encoding method information for each of the image data and the metadata is received.

9. The reception apparatus according to claim 8, wherein the display displays information indicating a compression encoding method for the image data and information indicating a compression encoding method for the metadata, using different windows.

10. The reception apparatus according to claim 9, wherein the display displays the information indicating the compression encoding method for the image data and the information indicating the compression encoding method for the metadata, using the same window.

11. The reception apparatus according to claim 8, wherein the metadata includes information indicating an object included in the image data, and the display displays information indicating information included in the metadata together with the information indicating the compression encoding method for the metadata.

12. A system that includes an imaging apparatus and a reception apparatus, the reception apparatus communicates with the transmission apparatus via a network, the system comprising:

a camera to capture an image of an imaging target;

at least one processor for changing at least one of a pan angle, a tilt angle and a zoom magnification of the camera, wherein the imaging apparatus includes transmitting image data based on the image captured by the camera, metadata, and encoding method information, wherein the encoding method information indicates options of a compression encoding method for the metadata which is settable to the imaging apparatus, wherein the metadata includes at least one of first information and second information, wherein the first information indicates at least one of the pan angle, the tilt angle and the zoom magnification of the camera, wherein the second information indicates an operating state, wherein the compression encoding method for the metadata is independent from a compression encoding method for the image data, and wherein the compression encoding method includes at least one of Efficient XML Interchange (EXI), Fast Infoset (FI), and Binary MPEG (BiM), wherein the reception apparatus includes requesting by transmitting a Get Metadata Configuration Options command to the camera, to transmit the encoding method information via the network and receiving the image data, the metadata, and the encoding method information from the imaging apparatus via the network, wherein the encoding method information transmitted based on the request is received, wherein transmission and reception of the encoding method information is independent from transmission and reception of the image data, and wherein the transmission and reception of the encoding method information is executed before setting of the compression encoding method for the metadata.

13. A method for controlling an imaging apparatus that communicates with a reception apparatus via a network, the method comprising:

capturing an image of an imaging target using a camera;
changing at least one of a pan angle, a tilt angle and a zoom magnification of the camera;
receiving a request for acquiring information about encoding image data and metadata from the reception apparatus via the network; and
transmitting image data based on the image captured by the camera, metadata, and encoding method information to the reception apparatus via the network, wherein the encoding method information indicates options of a compression encoding method for the metadata which is settable to the imaging apparatus, wherein the metadata includes at least one of first information and second information, wherein the first information indicates at least one of the pan angle, the tilt angle and the zoom magnification of the camera, wherein the second information indicates an operating state, wherein the compression encoding method for the metadata is independent from a compression encoding method for the image data, and wherein the compression encoding method includes at least one of Efficient XML Interchange (EXI), Fast Infoset (FI), and Binary MPEG (BiM), wherein transmission of the encoding method information is dependent upon a Get Metadata Configuration Options command from the reception apparatus, wherein transmission of the encoding method information is independent from transmission of the image data, and wherein the transmission of the encoding method information is executed before setting of the compression encoding method for the metadata.

14. A method for controlling a reception apparatus that communicates with an imaging apparatus that generates metadata and image data based on an image captured by a camera, changing at least one of a pan angle, a tilt angle and a zoom magnification of the camera, storing encoding method information, and transmitting the image data, the metadata, and the encoding method information via a network, wherein the encoding method information indicates options of a compression encoding method for the metadata which is settable to the imaging apparatus, wherein the metadata includes at least one of first information and second information, wherein the first information indicates at least one of the pan angle, the tilt angle and the zoom magnification of the camera, wherein the second information indicates an operating state, and wherein the compression encoding method includes at least one of Efficient XML Interchange (EXI), Fast Infoset (FI), and Binary MPEG (BiM), the method comprising:

receiving the image data and the metadata, from the imaging apparatus via the network,
requesting by transmitting a Get Metadata Configuration Options command to the camera, to transmit the encoding method information via the network,
wherein receiving of the encoding method information transmitted in response to the Get Metadata Configuration Options command from the camera,
wherein receiving of the encoding method information is independent from receiving of the image data, and
wherein the reception of the encoding method information is executed before setting of the compression encoding method for the metadata.

15. A non-transitory computer-readable storage medium storing a program that causes a computer to execute a method for controlling a reception apparatus that communicates with an imaging apparatus that generates metadata and image data based on an image captured by a camera, storing encoding method information, and transmitting the image data, the metadata, and the encoding method information, via a network, wherein the encoding method information indicates options of a compression encoding method for the metadata which is settable to the imaging apparatus, wherein the metadata includes at least one of first information and second information, wherein the first information indicates at least one of the pan angle, the tilt angle and the zoom magnification of the camera, wherein the second information indicates an operating state, and wherein the compression encoding method includes at least one of Efficient XML Interchange (EXI), Fast Infoset (FI), and Binary MPEG (BiM), the method comprising:

receiving the image data and the metadata, from the imaging apparatus via the network,
requesting by transmitting a Get Metadata Configuration Options command to the camera, to transmit the encoding method information via the network,
receiving the encoding method information transmitted in response to the Get Metadata Configuration Options command from the camera,
wherein receiving of the encoding method information is independent from receiving of the image data, and
wherein the reception of the encoding method information is executed before setting of the compression encoding method for the metadata.

16. A non-transitory computer-readable storage medium storing a program that causes a computer to execute a method for controlling an imaging apparatus that communicates with a reception apparatus via a network, the method comprises:

capturing an image of an imaging target using a camera;
changing at least one of a pan angle, a tilt angle and a zoom magnification of the camera; and
transmitting image data based on the image captured by the camera, metadata, and encoding method information to the reception apparatus via the network, wherein the encoding method information indicates options of a compression encoding method for the metadata which is settable to the imaging apparatus, wherein the metadata includes at least one of first information and second information, wherein the first information indicates at least one of the pan angle, the tilt angle and the zoom magnification of the camera, wherein the second information indicates an operating state, wherein the compression encoding method for the metadata is independent from a compression encoding method for the image data, and wherein the compression encoding method includes at least one of Efficient XML Interchange (EXI), Fast Infoset (FI), and Binary MPEG (BiM), wherein transmission of the encoding method information is dependent upon a Get Metadata Configuration Options command from the reception apparatus, wherein transmission of the encoding method information is independent from transmission of the image data, and wherein the transmission of the encoding method information is executed before setting of the compression encoding method for the metadata.

\* \* \* \* \*